United States Patent
Zinevich

(10) Patent No.: US 9,960,842 B2
(45) Date of Patent: May 1, 2018

(54) NETWORK TRAFFIC-COMPATIBLE TIME DOMAIN REFLECTOMETER

(71) Applicant: ARCOM DIGITAL, LLC, Syracuse, NY (US)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 0 days. days.

(21) Appl. No.: 15/283,510

(22) Filed: Oct. 3, 2016

(65) Prior Publication Data

US 2017/0104522 A1     Apr. 13, 2017

Related U.S. Application Data

(60) Provisional application No. 62/240,492, filed on Oct. 12, 2015.

(51) Int. Cl.
*H04B 10/08* (2006.01)
*H04B 10/071* (2013.01)
(Continued)

(52) U.S. Cl.
CPC ....... *H04B 10/071* (2013.01); *H04B 10/0793* (2013.01); *H04B 10/25751* (2013.01); *H04J 14/08* (2013.01); *H04L 5/0048* (2013.01)

(58) Field of Classification Search
CPC .............. H04B 10/071; H04B 10/0771; H04B 10/0793; H04B 10/0795; H04B 10/07955;
(Continued)

(56) References Cited

U.S. PATENT DOCUMENTS 5,461,318 A    10/1995  Borchert et al.
6,385,237 B1    5/2002  Tsui et al.
(Continued)

FOREIGN PATENT DOCUMENTS

EP           0487306 A2   5/1992
WO    WO2000057571 A1    9/2000
(Continued)

OTHER PUBLICATIONS

European Patent Office, International Search Report in PCT/US2016/055253, filed Oct. 4, 2016, (Publication No. WO2017066036A1), PCT counterpart to instant U.S. application, Search Report dated Dec. 16, 2016, pp. 1-4, published by World Intellectual Property Organization (WIPO), Geneva, Switzerland.
(Continued)

*Primary Examiner* — Hanh Phan
(74) *Attorney, Agent, or Firm* — Lawrence P. Trapani, Esq.

(57) ABSTRACT

A TDR for locating impairments in an HFC network is claimed. The network carries burst signals in an upstream band during burst intervals. The TDR comprises a transmitter, receiver, level detector, controller, accumulator, and probe detector. The transmitter transmits probe signals to the impairment, causing a reflection of the probe signals. Each probe signal is in the upstream band and has a bandwidth extending the width of the upstream band. The receiver receives the reflected probe signals during receiving intervals, and receives the burst signals during receiving intervals that overlap burst intervals. The level detector measures a level of the signals received during each receiving interval. The controller determines which of the receiving intervals are free of burst signals, based on the level measurement. The accumulator accumulates reflected probe signals received during intervals free of burst signals. The probe
(Continued)

detector detects the impairment from the accumulated probe signals and estimates a time delay for the impairment. A distance to the impairment is estimated from the time delay.

29 Claims, 10 Drawing Sheets

(51) Int. Cl.
*H04L 5/00* (2006.01)
*H04B 10/079* (2013.01)
*H04B 10/2575* (2013.01)
*H04J 14/08* (2006.01)

(58) Field of Classification Search
CPC . H04B 10/073; H04B 10/075; H04B 10/0791
USPC ........ 398/16, 21, 33, 34, 38, 10, 13, 17, 20, 398/24, 25, 30, 31, 72, 66, 68, 71, 100, 398/67, 69, 70; 356/73.1; 725/121, 124, 725/125, 127, 129
See application file for complete search history.

(56) References Cited

U.S. PATENT DOCUMENTS

| | | |
|---|---|---|
| 6,425,132 B1 | 7/2002 | Chappell |
| 6,570,394 B1 | 5/2003 | Williams |
| 6,687,632 B1 | 2/2004 | Rittman |
| 6,934,655 B2 | 8/2005 | Jones et al. |
| 7,024,680 B2 | 4/2006 | Howard |
| 7,069,163 B2 | 6/2006 | Gunther et al. |
| 7,213,257 B1 | 5/2007 | Emsley et al. |
| 7,250,772 B2 | 7/2007 | Furse et al. |
| 7,271,596 B2 | 9/2007 | Furse et al. |
| 7,415,367 B2 | 8/2008 | Williams |
| 7,584,496 B2 | 9/2009 | Zinevich |
| 7,788,050 B2 | 8/2010 | Williams |
| 8,058,880 B2 | 11/2011 | Bradley et al. |
| 8,294,469 B2 | 10/2012 | Bradley |
| 8,749,248 B2 | 6/2014 | Murphy et al. |
| 8,867,561 B2 | 10/2014 | Urban et al. |
| 8,908,538 B1 | 12/2014 | Williams |
| 9,054,782 B2 | 6/2015 | Hunter |
| 9,100,339 B1 | 8/2015 | Hamzeh |
| 9,160,463 B2 | 10/2015 | Hunter |
| 9,203,664 B2 | 12/2015 | Currivan et al. |
| 9,209,863 B2 | 12/2015 | Williams et al. |
| 9,225,387 B2 | 12/2015 | Williams et al. |
| 9,264,924 B2 | 2/2016 | Williams |
| 9,350,986 B2 | 5/2016 | Chappell et al. |
| 9,357,163 B2 | 5/2016 | Maxson et al. |
| 2002/0086641 A1 | 7/2002 | Howard |
| 2002/0094785 A1 | 7/2002 | Deats |
| 2003/0040277 A1 | 2/2003 | Deats |
| 2004/0039976 A1 | 2/2004 | Gunther et al. |
| 2004/0245995 A1 | 12/2004 | Williams |
| 2005/0233702 A1 | 10/2005 | Ferguson |
| 2006/0012376 A1 | 1/2006 | Furse et al. |
| 2008/0220723 A1 | 9/2008 | Krishnamoorthi et al. |
| 2008/0320541 A1 | 12/2008 | Zinevich |
| 2009/0125253 A1 | 5/2009 | Blair et al. |
| 2010/0070228 A1 | 3/2010 | Chappell |
| 2011/0013904 A1* | 1/2011 | Khermosh ......... G01M 11/3118 398/16 |
| 2011/0194418 A1 | 8/2011 | Wolcott et al. |
| 2011/0194597 A1 | 8/2011 | Wolcott et al. |
| 2011/0224923 A1 | 9/2011 | Blair et al. |
| 2012/0155307 A1 | 6/2012 | Turk et al. |
| 2013/0176860 A1 | 7/2013 | Wolcott et al. |
| 2014/0029932 A1 | 1/2014 | Randel et al. |
| 2014/0036975 A1 | 2/2014 | Wolcott et al. |
| 2014/0153624 A1 | 6/2014 | Wolcott et al. |
| 2014/0193147 A1* | 7/2014 | Smith .................. H04B 10/071 398/16 |
| 2014/0241409 A1 | 8/2014 | Wolcott et al. |
| 2014/0254392 A1 | 9/2014 | Wolcott et al. |
| 2014/0254407 A1 | 9/2014 | Williams |
| 2014/0294052 A1 | 10/2014 | Currivan et al. |
| 2015/0020128 A1 | 1/2015 | Maxson et al. |
| 2015/0043624 A1 | 2/2015 | Williams et al. |
| 2015/0078194 A1 | 3/2015 | Currivan et al. |
| 2015/0139349 A1 | 5/2015 | Hamzeh |
| 2015/0229416 A1 | 8/2015 | Williams |
| 2015/0326464 A1 | 11/2015 | Wolcott et al. |
| 2015/0341810 A1 | 11/2015 | Murphy |
| 2016/0028496 A1 | 1/2016 | Currivan et al. |
| 2016/0036492 A1 | 2/2016 | Williams et al. |
| 2016/0057479 A1 | 2/2016 | Bush et al. |
| 2016/0112734 A1 | 4/2016 | Williams et al. |
| 2017/0034507 A1 | 2/2017 | Harris et al. |
| 2017/0063429 A1 | 3/2017 | Flask |
| 2017/0063478 A1 | 3/2017 | Flask |
| 2017/0077988 A1 | 3/2017 | Flask |

FOREIGN PATENT DOCUMENTS

| | | |
|---|---|---|
| WO | WO2004070398 A1 | 8/2004 |
| WO | WO2006091708 A1 | 8/2006 |
| WO | WO2012009757 A1 | 1/2012 |
| WO | WO2012126056 A1 | 9/2012 |

OTHER PUBLICATIONS

European Patent Office, Written Opinion of International Searching Authority in PCT/US2016/055253, filed Oct. 4, 2016, (Publication No. WO2017066036A1), PCT counterpart to instant U.S. application, Written Opinion dated Dec. 16, 2016, pp. 1-6, published by World Intellectual Property Organization (WIPO), Geneva, Switzerland.

Arcom Digital, LLC, Quiver S User Guide, QVR-SUG-v.1.1, Apr. 13, 2015, pp. 1-37, Arcom Digital, LLC, Syracuse, NY.

U.S. Appl. No. 62/054,529, filed Sep. 24, 2014, Williams et al., PDF document pp. 33-35.

Cablelabs®, Data-Over-Cable Service Interface Specifications, DOCSIS® 3.1Physical Layer Specification CM-SP-PHYv3.1-I03-140610, Jun. 10, 2014, pp. 1-239, Cable Television Laboratories, Inc., Louisville, CO, www.cablelabs.com/wp-content/uploads/specdocs/CM-SP-PHYv3.1-I03-140610.pdf.

Campos, Alberto, Andreoli-Fang, Jennifer & Ganti, Vivek, Cable Network Management Infrastructure Evolution, Apr. 2014, pp. 1-19, Cable Television Laboratories, Inc. (Cablelabs®), Louisville, CO.

Arcom Digital, LLC, Unbundled Quiver User Guide, Xcor-UBQUG-v.1.0, Mar. 5, 2014, pp. 1-38, Arcom Digital, LLC, Syracuse, NY.

Volpe, Bradley, DOCSIS Pre-Equalization: Vastly Powerful, Often Undervalued, Zcorum's Ask a Broadband Expert Series, Jan. 10, 2014, pp. 1-19 (see TDR at 10-11 & 13), Zcorum.com, Alpharetta, GA.

Williams, Thomas & Campos, Alberto, Presentation entitled, Distortion Testing in Home Terminals, CableLabs® SCTE Conference Demo, Oct. 21-24, 2013, p. 1, Cable Television Laboratories, Inc., Louisville, CO.

Campos, Alberto, Hamzeh, Belal & Williams, Thomas, Testing for Nonlinear Distortion in Cable Networks, Oct. 2013, pp. 4-16, Cable Television Laboratories, Inc. (Cablelabs®), Louisville, CO.

Williams, Thomas, Hamzeh, Belal & Hranac, Ron, Field Measurements of Nonlinear Distortion in Digital Cable Plants, Jan. 2013, pp. 1-10, Cable Television Laboratories, Inc. (Cablelabs®), Louisville, CO.

Williams, Thomas, Non-Service Interrupting Time Domain Reflectometer (TDR) Using Bidirectional Injection, Aug. 29, 2012, pp. 1-4, Cable Television Laboratories, Inc., Louisville, CO.

Arcom Digital, LLC, Quiver User Guide, Xcor-QUG-v.3.0.4, Aug. 13, 2012, pp. 1-71, Arcom Digital, LLC, Syracuse, NY.

Agilent Technologies, Inc., Agilent Time Domain Analysis Using a Network Analyzer, Application Note 1287-12, May 2, 2012, p. 1-48, Agilent Technologies, Inc. (now Keysight Technologies, Inc.), Santa Rosa, CA.

(56) References Cited

OTHER PUBLICATIONS

DOCSIS® Best Practices and Guidelines, Proactive Network Maintenance Using Pre-equalization, CM-GL-PNMP-V02-110623, Jun. 23, 2011, pp. 1-133, Cable Television Laboratories, Inc., Louisville, CO, www.cablelabs.com/wp-content/uploads/2014/05/CM-GL-PNMP-V02-110623.pdf.

Arcom Digital, LLC, Hunter® Xcor System (www.arcomlabs.com/4HunterPlafform.html), Hunter with XCOR, The Ultimate Network-Hardening Tool, Mar. 9, 2011, pp. 1-2, Arcom Digital, LLC, Syracuse, NY.

Arcom Digital, LLC, QTP-20 Test Probe, Quiver, a Field Unit That Tracks Network Impairments to Within a Few Feet, Feb. 16, 2011,pp. 1-3, Arcom Digital, LLC, Syracuse, NY, www.arcomlabs.com/images/documents/quiver_sell_sheet.pdf.

Hranac, Ron, A Novel Approach to Troubleshooting Linear Distortions, Cablefax.com, Oct. 1, 2010, pp. 1-3, Cablefax Daily, www.cablefax.com/archives/a-novel-approach-to-troubleshooting-linear-distortions.

Moran, Jack, Slide Presentation, RF Impairments in the Return Path & Their Impact on a DOCSIS Performance or the RF World According to Jack, Jan. 13, 2004, pp. 1-54, Motorola-BCS, Marlborough, MA.

\* cited by examiner

NETWORK TRAFFIC-COMPATIBLE TIME DOMAIN REFLECTOMETER

CROSS-REFERENCE TO RELATED APPLICATIONS

This application claims the benefit of U.S. Provisional Application No. 62/240,492, filed Oct. 12, 2015, which is incorporated herein by reference.

BACKGROUND OF THE INVENTION

Field of Invention

The present invention relates generally to monitoring impairments in a Hybrid Fiber-Coax (HFC) network, and more particularly to apparatus and methods for detecting and locating linear impairments such as, but not limited to, impedance mismatches causing micro-reflections in a coaxial cable plant of an HFC network.

Background Art

Micro-reflections are one of the most critical impairments in an HFC network, especially in the return path where signal losses in the cable are minimal and reflected signals from even remote impedance mismatches can impact upstream service signals from DOCSIS cable modems (CMs). Detection and location of mismatches can be a challenging problem in an HFC network carrying signal traffic or service signals ("live HFC network"). Traditional methods of detection and location have involved Time-Domain Reflectometry (TDR). In general, TDR involves the injection of high-powered probe signals or pulses into the network and the measurement of time delay, level and polarity of the reflected probe signal/pulse from mismatches in the network. Employment of TDR in a live HFC network is challenging because of the number of service signals present and the fact that the service signals can be disrupted by the probe signal and can interfere with the detection of reflected probe signals (e.g., a low-level reflected probe signal can be masked by strong service signals). Thus, heretofore, TDR has not been very practicable for testing in a live HFC network.

A technique for detecting mismatches in the return path of a live HFC network without injecting a probe signal has been developed by CableLabs® as part of the Proactive Network Maintenance (PNM) initiative. It is described in a published document entitled, DOCSIS® Best Practices and Guidelines, Proactive Network Maintenance Using Pre-Equalization, CM-GL-PNMP-V02-110623, by Cable Television Laboratories, Inc., Louisville, Colo., Jun. 23, 2011 (http://www.cablelabs.com/wp-content/uploads/2014/05/CM-GL-PNMP-V02-110623.pdf). The PNM technique is based on using pre-equalization coefficients from CMs operating in the HFC network. This technique can be classified as virtual TDR, because the upstream QAM service signals serve as the probe signals. Briefly, this technique can detect a micro-reflection of an upstream QAM signal (transmitted from a CM to a Cable Modem Termination System) and measure the time delay of the micro-reflection (relative to the initial signal) by analysis of pre-equalization coefficients. Then, by using electronic maps, a probable point in the network where the micro-reflection occurred (impedance mismatch) is located. The declared accuracy of the PNM technique is about +/−50 feet. This is not as accurate as traditional TDR using a wideband probe signal. The accuracy of the PNM technique is limited by the bandwidth of one upstream QAM channel (6.4 MHz in the U.S.) and by the number of pre-equalization coefficients. In addition, the PNM technique usually identifies only a branch in the coaxial cable portion of the network where the mismatch is located. Despite these limitations, PNM technology is widely used in cable TV HFC networks today.

Another technique for locating mismatches in a live HFC network uses downstream signals of the HFC network. This technique is disclosed in U.S. Pat. No. 6,385,237 to Tsui et al. This patent indicates that it discloses a method and system for non-invasive testing of a digital cable network. No probe signal is injected into the network. Amplitude measurements are made over a wide band of frequencies of the downstream spectrum and the resulting spectrum of measurements are then converted to the time domain. An adaptive filter then seeks to match its output to the time domain representation, thereby characterizing the communication channel (i.e., the cable). It is stated that impedance mismatches may be located using this technique and that the accuracy of location may be to within 0.7 meters (Col. 10, lines 6-11).

CableLabs® has also proposed to use the full downstream signal to detect and locate impedance mismatches in a live HFC network. See, e.g., presentation entitled, Distortion Testing in Home Terminals, CableLabs® SCTE Conference Demo, Oct. 21-24, 2013, by Thomas Williams and Alberto Campos. In this technique, the full-spectrum downstream signal is captured by a modern CM (e.g., containing a new Broadcom® chipset) and then the autocorrelation function of the signal (which may contain a reflected signal) is calculated. Again, no probe signal is injected into the network. If a reflection exists, it would appear as a spike (in addition to the main detection peak) in the autocorrelation function. Thus, the time-distance between the main peak and the reflection spike can be measured. This technique allows one to measure the time delay of a reflection more accurately (thus pinpointing the location more accurately) than the PNM upstream technique identified above. However, this downstream technique has some drawbacks. First, to provide good detection sensitivity, the accumulation time for estimating the autocorrelation function should be relatively long (e.g., tens of milliseconds), while the duration of the captured full downstream signal is limited to only tens of microseconds. The capture duration is limited to achieve a reasonable resolution bandwidth for spectral analysis (e.g., 30 kHz) and a reasonable data size (e.g., 30 Kbytes). Therefore, to achieve an adequate accumulation time it may be necessary to carry out a large number of captures, which could take time and impact CM signal traffic. Another limitation is that continuous wave (CW) or narrowband downstream signals, such as analog video carriers, AGC pilots, and OFDM pilot subcarriers, may be included in the autocorrelation, which could contribute flat or spread components to the function. These flat or spread components could mask actual reflection spikes and reduce sensitivity and time resolution (distance accuracy).

Another known technique, somewhat similar to CableLabs' full downstream capture technique, is disclosed in U.S. Pat. No. 7,271,596 to Furse et al. In Furse et al., reflections from impedance mismatches are also detected by obtaining an autocorrelation function of a full-spectrum service signal (an "operational signal"). However, in a modern HFC network, the capturing and processing of the full-spectrum operational signal and estimating its autocorrelation function is not a trivial task and has certain drawbacks as discussed above. A downstream signal in an HFC network has a very wide bandwidth (e.g., 1 GHz with a probable increase to 1.7 GHz under DOCSIS 3.1). Therefore, sampling and digitally processing this signal requires expensive and high power-consuming chipsets. Also, TDR is generally used in a section of a coaxial plant that contains only passive network devices ("passive section"), e.g., between adjacent trunk amplifiers. Downstream signals that pass through amplifiers may already contain reflected signals which could, in an autocorrelation function, mask reflections originating in the passive section under test.

The use of spread spectrum modulation of a TDR probe signal is also a known technique for testing a communications network carrying service signals. See, for example, U.S. Pat. No. 7,069,163 to Gunther, where a digital data signal is transmitted in an aircraft communication cable and a probe signal is created by spread spectrum modulating the digital data signal. Then, the spread spectrum probe signal is injected into the cable while the cable is carrying the original unaltered digital data signal. A reflected probe signal is received and cross-correlated with the original probe signal to obtain a correlation peak, which represents a time delay (roundtrip propagation time) associated with a mismatch. A matched filter implementation is also described in connection with FIG. 7. Direct Sequence Spread Spectrum, Frequency Hopped Spread Spectrum, and Zero Coding Spread Spectrum are listed as types of spread spectrum that could be used. This technique works well in the case where the digital data signal is fully random and its autocorrelation function approximates the Dirac delta function. But, the spectrum of service signals in the return path of an HFC cable television network contains a group of adjacent QAM signals separated by guard bands and also contains narrowband signals, such as set top box FSK signals. So, despite the random nature of each QAM signal, the autocorrelation function of a full return spectrum (to achieve optimal time resolution) will contain a number of high-level sidelobes which could mask the reflected signal. Another problem, as noted above, is potential interference by high-level service signals with the reflected signal. A further problem is that the return service signals may already be pre-corrected from PNM pre-equalization at the CM; thus, the autocorrelation function of these signals may contain extra peaks (caused by pre-equalization processing) and such peaks will produce false alarms (false detection) of impedance mismatches. Thus, the technique may not satisfy the need for an accurate, effective and reliable TDR test meter for the return path of an HFC cable television network.

As already suggested, the preferred approach to accurately pinpointing locations of micro-reflections in an HFC cable television network is to use a TDR meter in the field. Therefore, efforts have been made to develop handheld, battery-powered TDR test meters capable of being coupled to the network at an appropriate and convenient test point (e.g., amplifier test port). The meter is used to locate an impedance mismatch and, once a repair has been made, to confirm that the mismatch has been fixed. In the field, an opportunity may not be available to poll data from nearby CMs to determine the presence of micro-reflection distortion. Also, implementing a technique that captures the whole downstream signal in a handheld meter for analysis may not be cost effective, because high resolution analog-to-digital converter chips with 2 GHz plus sampling rates are needed to capture the downstream signal. The chips are still very expensive and have high power consumption (e.g., a few Watts). Further, to undertake the necessary signal processing of a full downstream spectrum, a powerful, high cost, high power-consuming, computer or processor would be required.

In view of the above discussion, it is apparent that a need exists for a non-invasive, low-cost, low power-consuming, handheld TDR meter for detecting micro-reflections and locating their cause in a live HFC cable television network.

OBJECTS AND SUMMARY OF THE INVENTION

It is therefore an object of the present invention to overcome the problems associated with the prior art and to fulfill the aforesaid need.

It is another object of the present invention to provide TDR apparatus and methods for coaxial cable plants of HFC networks.

It is a further object of the present invention to provide TDR apparatus and methods that operate in a live HFC network without interfering with service signals transmitted in the network.

It is still another object of the present invention to provide TDR apparatus and methods that inject probe signals into an HFC network under test at a level that does not interfere with service signals of the network ("low-level").

It is still a further object of the present invention to provide TDR apparatus and methods that calibrate a level of a probe signal to be injected into a HFC network under test, where the calibrated level minimizes the chance that the probe signal will interfere with the service signals of the network.

It is yet another object of the present invention to provide TDR apparatus and methods that utilize a probe signal having a relatively wide bandwidth to maximize the time resolution and accuracy of pinpointing the location of an impairment in a coaxial cable plant of an HFC network.

It is yet a further object of the present invention to provide TDR apparatus and methods that can locate an impairment in a coaxial cable plant with an accuracy of less than 50 feet.

It is yet still another object of the present invention to provide TDR apparatus and methods utilizing a probe signal to generate a reflected probe signal at an impairment in a coaxial cable plant, where the probe signal and the reflected probe signal are not substantially interfered with by service signals transmitted in the cable plant.

It is yet still a further object of the present invention to provide TDR apparatus and methods utilizing a probe signal to generate a reflected probe signal at an impairment in a coaxial cable plant, where the reflected probe signal is detected during intervals substantially free of transmission of service signals in the cable plant ("free intervals").

It is yet still another object of the present invention to provide TDR apparatus and methods utilizing a probe signal to generate a reflected probe signal at an impairment in a coaxial cable plant, where the probe signal is defined by parameters that help maximize detection of the reflected probe signal during free intervals.

It is yet still a further object of the present invention to provide TDR apparatus and methods utilizing a probe signal to generate a reflected probe signal at an impairment in a coaxial cable plant, where the detection of the reflected probe signal (and thus the impairment) is at a relatively high sensitivity.

It is yet still another object of the present invention to provide a field-deployable, portable, hand-held TDR meter that detects and locates impairments in a coaxial cable trunk or hard line of an HFC network.

It is yet still a further object of the present invention to provide a field-deployable, portable, handheld TDR meter that detects and locates impairments in a coaxial cable drop line of an HFC network.

It is yet still another object of the present invention to provide a low-cost, low power-consuming, and accurate TDR meter for detecting and locating impairments in a coaxial cable portion of an HFC network.

These and other objects are attained in accordance with the present invention, wherein there is provided, in one embodiment, a time domain reflectometer for locating a linear impairment in a coaxial cable portion of an HFC network. The coaxial cable portion carries burst signals in an upstream frequency band. The burst signals are transmitted in the cable portion only during burst intervals. The time domain reflectometer comprises a probe signal transmitter, a receiver, a level detector, a controller, an accumulator, and a probe signal detector. In operation, the probe signal transmitter is coupled to the coaxial cable portion of the HFC network. The transmitter transmits a sequence of low-level probe signals to the linear impairment, causing a reflection of the probe signals from the linear impairment. Each probe signal is defined by a band of frequencies within the upstream frequency band and has a bandwidth that extends substantially the width of the upstream frequency band. In operation, the receiver is coupled to the coaxial cable portion of the HFC network and receives the reflection of the probe signals as a sequence of reflected probe signals and receives the burst signals during the burst intervals. The receiver receives the sequence of reflected probe signals during a plurality of receiving intervals, respectively, and receives the burst signals during the receiving intervals that overlap the burst intervals. The level detector measures a level of the signals received by the receiver during each of the receiving intervals, such that a plurality of level measurements are made for the plurality of receiving intervals, respectively. The controller determines, for each receiving interval, whether the signals received by the receiver are substantially free of the burst signals, based on the level measurement associated with the receiving interval. The accumulator coherently accumulates only those reflected probe signals that are received during receiving intervals substantially free of the burst signals. The probe signal detector detects the linear impairment from the accumulated reflected probe signals and estimates a time delay between transmission of the probe signals by the probe signal transmitter and reception of the reflected probe signals by the receiver. A distance to the linear impairment is estimated from the time delay.

In a preferred embodiment, the probe signals used by the time domain reflectometer are a coherent sequence of low-level chirp pulses. The chirp pulses have a spectrum or bandwidth that extends over the entire upstream frequency band (e.g., 5-42 MHz in traditional U.S. systems). In the operating environment of the preferred embodiment (but not part of the preferred embodiment), the burst signals are QAM signals, e.g., 64-QAM signals, transmitted upstream by cable modems (CMs) and received by cable modem termination systems (CMTS's).

Methods of locating a linear impairment in a coaxial cable portion of an HFC network are also contemplated by the present invention. The coaxial cable portion of the network carries burst signals in an upstream frequency band. The burst signals are transmitted in the cable portion only during burst intervals. In one embodiment, the method comprises the steps of: (a) transmitting a sequence of low-level probe signals to the linear impairment and causing a reflection of the probe signals at the linear impairment, where each probe signal is defined by a band of frequencies within the upstream frequency band and has a bandwidth that extends substantially the width of the upstream frequency band; (b) receiving the reflection of the probe signals as a sequence of reflected probe signals and receiving the burst signals during the burst intervals, where the sequence of reflected probe signals are received during a plurality of receiving intervals, respectively, and where the burst signals are received during the receiving intervals that overlap the burst intervals; (c) measuring a level of the signals received during each of the receiving intervals, such that a plurality of level measurements are made for the plurality of receiving intervals, respectively; (d) determining, for each receiving interval, whether the signals received are substantially free of the burst signals, based on the level measurement associated with the receiving interval; (e) coherently accumulating only those reflected probe signals that are received during receiving intervals determined to be substantially free of the burst signals; (f) detecting the linear impairment from the accumulated reflected probe signals and estimating a time delay between transmission of the probe signals in step (a) and reception of the reflected probe signals in step (b); and (g) estimating the distance to the linear impairment from the time delay estimated in step (f).

An extension or modification of the above method concerns calibrating or setting an operating level of the probe signal. The operating level is the level at which the probe signal is transmitted in the coaxial cable plant. In the HFC network under test, the upstream frequency band is separated from a downstream frequency band by a guard band. The extension or modification of the above method comprises the steps of: (h) transmitting, at a transmit level, a narrowband test signal in the coaxial cable portion of the HFC network, where the test signal has a frequency spectrum located in the guard band such that interference by the test signal with signals in the upstream and downstream frequency bands is substantially avoided; (i) receiving from the coaxial cable portion of the HFC network the test signal transmitted in the guard band in step (h) and the burst signals in the upstream band; (j) measuring a level of the test signal and a level of the burst signals received in step (i); (k) comparing a difference or ratio between the level of the test signal and the level of the burst signals measured in step (j) to a threshold value representing a condition of substantially no interference between the upstream probe signal and the upstream burst signals; (l) if the difference or ratio does not meet the threshold value, then adjusting the transmit level of the test signal until the difference or ratio at least meets the threshold value, to produce an adjusted transmit level of the test signal; and (m) setting the operating level of the upstream probe signal to the adjusted transmit level of the test signal, whereby interference between the upstream probe signal and the upstream burst signals is substantially avoided.

BRIEF DESCRIPTION OF THE DRAWING

Further objects of the present invention will become apparent from the following description of the preferred embodiment, with reference to the accompanying drawing, in which:

FIG. 3A shows a CW calibration or test signal, FIG. 3B shows the probe signal in the form of a coherent sequence of chirp probe pulses, and FIG. 3C shows the sequence of probe chirp pulses at the output of a CMTS QAM receiver having a 6.4 MHz bandwidth;

DETAILED DESCRIPTION OF THE PREFERRED EMBODIMENT

Time domain reflectometry (TDR) apparatus and methods according to the preferred embodiment of the present invention is based on the following features:
1. Using low-level spread spectrum probe signals within full upstream bandwidth of an HFC network, to prevent interference with service signals and provide maximum time resolution;
2. Injection of a continuous wave (CW) calibration or test signal into the guard band, between upstream and downstream bands, before testing network with probe signal, for accurate setting of probe signal level (operational level) to prevent interference with upstream service signals;
3. Using coherent sequence of short chirp pulses, as the preferred spread spectrum probe signal, for providing immunity from high-level QAM burst signals in upstream band and further reducing interference with the QAM and other service signals; and
4. Receiving reflected probe signal in time intervals when there are no high-level QAM burst signals, to maximize sensitivity of the TDR measurement.

The TDR apparatus and methods of the present invention concern two main measurement scenarios for detecting and locating linear impairments in a coaxial cable portion of an HFC network. The first scenario is employed when the expected location of the impairment is in the trunk (or hard) line. Typically, as was noted above, the PNM method allows one to identify a particular branch in the coaxial plant where a mismatch is located. The second scenario is employed when the expected location of the impairment is in the drop line between a CM in a subscriber premises and a multi-tap at the pole (trunk or hard line). The latter scenario is typical for home certification testing and when the PNM method indicates a probable impairment at a short distance, and/or when one CM on a tap experiences micro-reflection distortions and the other CMs on the same tap do not.

Figure 1:
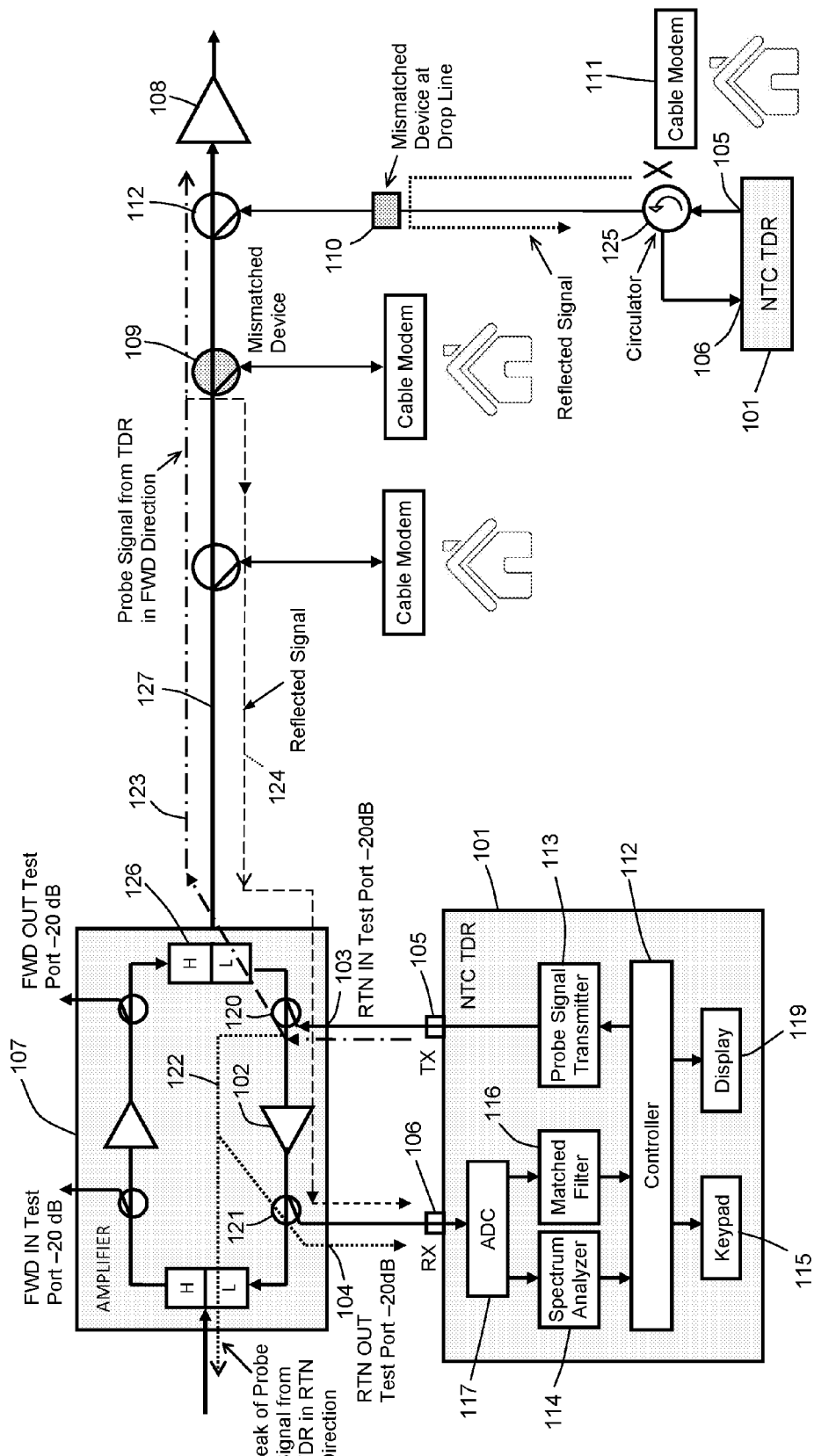
FIG. 1 is a block diagram showing a portion of a coaxial cable plant of an HFC network containing impedance mismatches in the trunk and drop lines, and showing a TDR meter according to the present invention coupled to the coaxial cable plant at test points in a return leg of a bi-directional amplifier.

Both of the above-mentioned scenarios are illustrated on FIG. 1. A first mismatch in a trunk line 127 is located at a tap 109, between cascaded bi-directional amplifiers 107 and 108. A second mismatch in a drop line is located at a device 110 (splitter, ground block, etc.) between a CM 111 and a tap 112. To detect the mismatch in trunk line 127, a TDR meter 101, constructed in accordance with the present invention, is connected to a pair of standard test ports 103 and 104 (typically −20 dB loss) of a return (or upstream) leg of bi-directional amp 107. The return leg includes a tap 120, a return amplifier 102, and a tap 121. Test port 103 (on the input side of return amplifier 102) is used for injecting a probe signal into trunk 127 from TDR meter 101. Test port 104 (on the output side of return amplifier 102) is used to receive the reflected probe signal and to calibrate the operational or transmit level of the probe signal. In the preferred embodiment, TDR meter 101 has separate transmit (Tx) and receive (Rx) ports 105 and 106, which correspond to test ports 103 and 104 for easy connection of meter 101 to the test ports. In TDR meter 101, a probe signal 123 is generated by a probe signal transmitter 113. Signal 123 then travels though Tx port 105, test port 103, tap 120 and a diplex filter 126 (of amp 107) to coaxial cable trunk line 127. Due to the fact that tap 120 has limited isolation (typically −40 dB), a portion of probe signal 123 passes, as a leak signal 122, through tap 120 and return amp 102 and continues in the upstream direction to a fiber node and a CMTS. Leak signal 122 can potentially interfere with QAM service signals in the upstream (return) path. To prevent such interference, the level of probe signal 123 (and thus the level of leak signal 122) should be accurately calibrated and set lower than the standard threshold for signal-to-noise-plus-interference ratio (SNIR) in the upstream path (i.e., the minimally accepted SNIR). According to the Data-Over-Cable Service Interface Specifications 3.1 (DOCSIS 3.1), published by Cable Television Laboratories, Inc. of Louisville, Colo., the SNIR threshold for QAM signals should be 25 dB.

To provide an acceptable setting of the probe signal level (operational level), TDR meter 101 undertakes a calibration procedure using a narrowband or preferably CW test signal. The CW test signal is generated by transmitter 113 at a frequency located in the guard band of the bi-directional spectrum of the HFC network, where the guard band is between an upstream frequency band and a downstream frequency band. In the United States, HFC networks traditionally have had a 5-42 MHz upstream band and a guard band of 42-54 MHz. The guard band does not carry any service signals because this band is substantially rejected at diplexer filters of each cascaded bi-directional amplifier and because time delay distortions are high in this band. So, when TDR 101 generates the CW test signal in the guard band (42-54 MHz), there is little or no risk that the CW test signal will impact either upstream or downstream service signals. A leak of the CW test signal (also referred to as leak signal 122) leaks in the upstream direction through tap 120, return amp 102, and tap 121. A sample of CW leak signal 122 passes through test port 104 (FIG. 1) and is received by receive port 106 of TDR meter 101. CW leak signal 122 is then digitized at analog-to-digital converter (ADC) 117 and the resulting digital samples of the signal are received and processed by an FFT spectrum analyzer 114.

Figure 2:
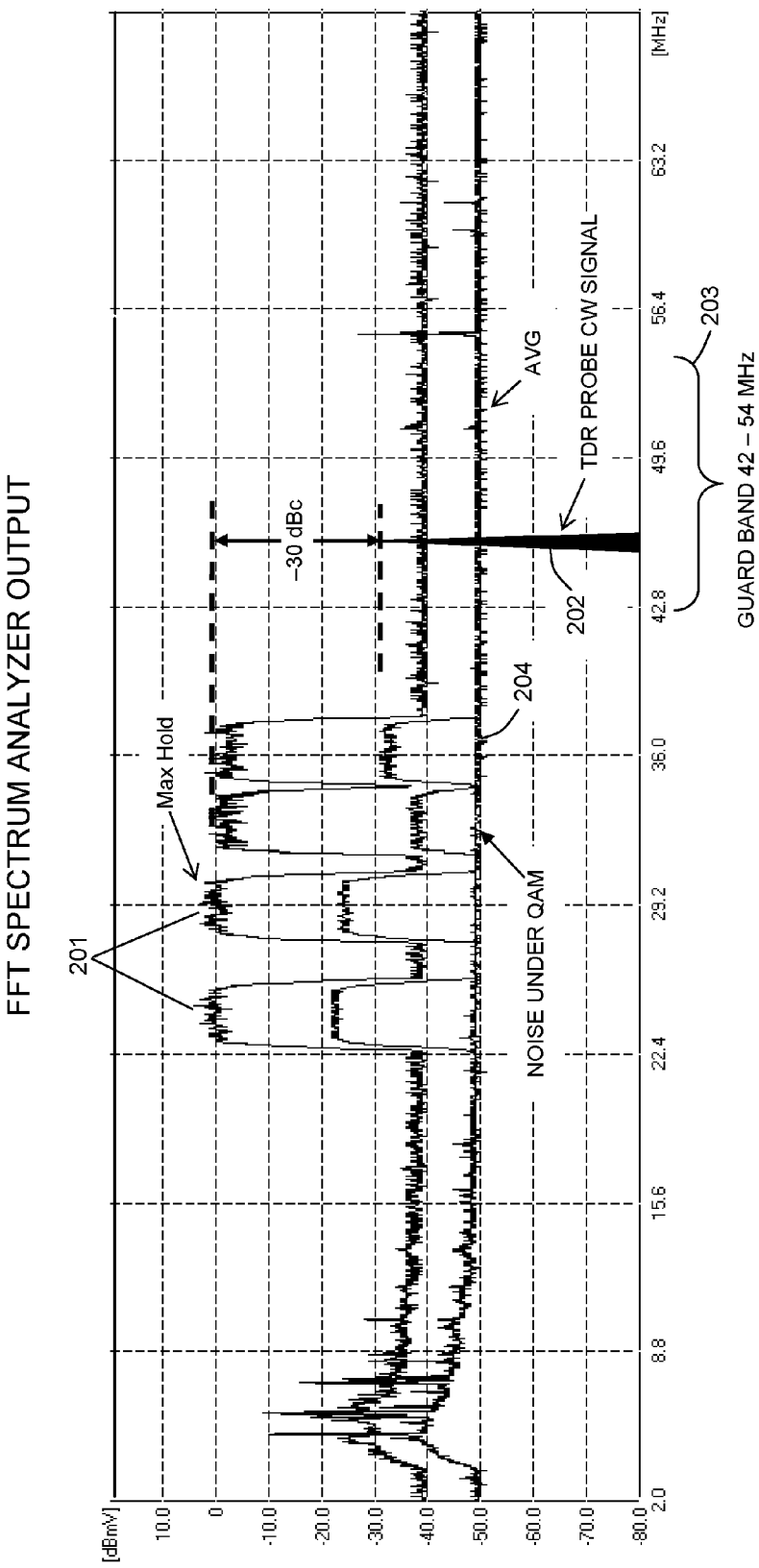
FIG. 2 is a frequency spectrum sweep of signals received the TDR meter of the present invention, showing QAM burst signals transmitted by CMs in an upstream band and a continuous wave (CW) test signal in a guard band between the upstream band and a downstream band.

The output of FFT spectrum analyzer 114 is shown on FIG. 2. The spectrum in FIG. 2 includes QAM signals 201 from CMs in the upstream band and CW signal 202 in a guard band 203 (42-54 MHz). Spectrum analyzer 114 measures the levels of QAM signals 201 and CW signal 202. Based on these levels, a controller 118 (FIG. 1) automatically adjusts the transmit level of the CW test signal at transmitter 113, to iteratively and ultimately arrive at a transmit level that will produce a difference or ratio of levels (or relative level) between the two signals that is below the DOCSIS 3.1 SNIR threshold of −25 dBc. As shown in FIG. 2, the measured level of QAM signals 201 is actually the maximum level of the haystack of the QAM signals. This is done in a Max Hold mode of spectrum analyzer 114. In this example, the desired difference or ratio of levels (or relative level) between the two signals is −30 dB, which may be referred to as the adjustment threshold value. The adjustment threshold value represents a condition under which interference between the probe signal 123 and QAM signals 201 is avoided upstream of the test ports, particularly at the CMTS's. If the difference or ratio of measured levels between CW test signal 202 and QAM signals 201 does not meet the adjustment threshold value, the transmit level of the CW test signal at transmitter 113 is adjusted until the difference or ratio meets or exceeds the adjustment threshold value (i.e., as mentioned, it iteratively arrives at an appropriate transmit level for CW test signal). Spectrum analyzer 114 has RezBW=100 kHz, so, the actual level of the QAM signal will be 8 dB higher than as shown in FIG. 2. Thus, the effective SNIR will be about −38 dB (assuming the CW signal is the only interference). This ratio is much greater than the DOCSIS threshold of −25 dB. Once, the transmit level of the CW test signal is adjusted to achieve or exceed the adjustment threshold ("adjusted transmit level"), the transmit level of probe signal 123 (at transmitter 113) is set to the adjusted transmit level. Then, TDR meter 101 starts to generate spread spectrum probe signals 123 at exactly the adjusted transmit level and over the full upstream band of 5-42 MHz. So, although probe signals 123 cover the entire upstream band, probe signals 123 will not interfere with the upstream QAM service signals at the CMTS. This is true because the probe signal level is lower than the accepted SNIR threshold. A probe signal meeting this criterion is referred to herein as a "low-level probe signal," and if the probe signal meeting the criterion is a chirp pulse, it is referred to as "a low-level chirp pulse." Interference with probe signal 123 is also avoided because the energy of probe signal 123 is distributed over the full upstream band, thus less energy appears in any one QAM channel (only 6.4 MHz).

Figure 3A:
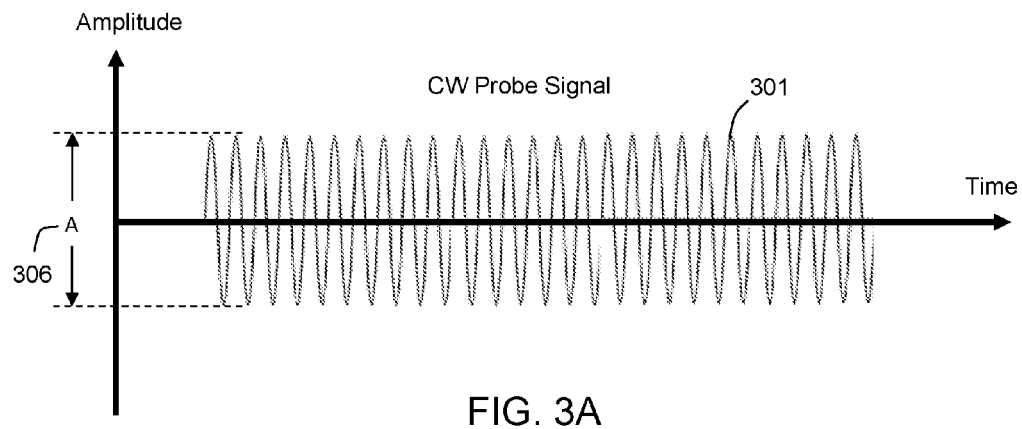
FIGS. 3A-C is a series of amplitude-versus-time plots of the signals of the TDR meter of the present invention, where
Figure 3B:
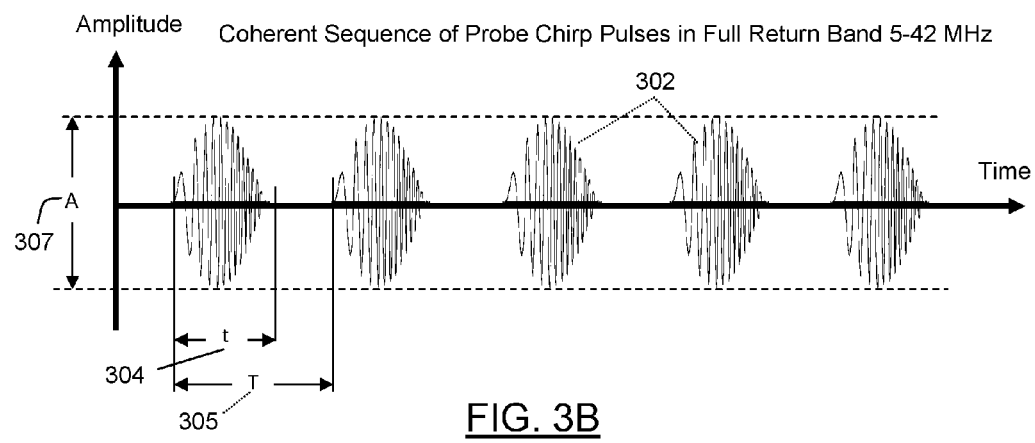

Referring to FIGS. 3A and 3B, there is shown a CW test signal 301 and a spread spectrum probe signal 302 (both in the time domain). Note, in FIG. 3A, the amplitude or level 306 of test signal 301 is the same as the amplitude or level 307 of chirp (probe) pulses 302. In general, different spread spectrum probe signals can be used in TDR meter 101. But, the preferred probe signal is a coherent sequence of short chirp pulses 302 (FIG. 3B). Chirp pulses 302 provide a good compromise between occupied frequency band and the shape of the auto-correlation function for the detection of a reflected probe signal. Also, an advantage of a coherent sequence of short chirp pulses (further explained below) is that the short pulses are compatible with short time intervals that are free from high-level QAM service signals in the upstream band. These short time intervals (with no QAM signals) are used to receive reflected chirp pulses without interference by high-level QAM signals. The QAM service signals (e.g., QAM signals 201 in FIG. 2) are burst signals and are transmitted by CMs in the upstream band only during burst intervals. Between burst intervals are short time intervals for receiving the reflected chirp pulses without interference of QAM service signals. A further explanation of these intervals is given below and illustrated in FIG. 4. Chirp pulses 302 are defined by a duration ("t") 304 and a period ("T") 305. Each chirp pulse 303 is an up-chirp pulse, meaning that the frequency increases from beginning to end of the pulse. In the example given, the beginning frequency is 5 MHz and the end frequency is 42 MHz.

Figure 3C:
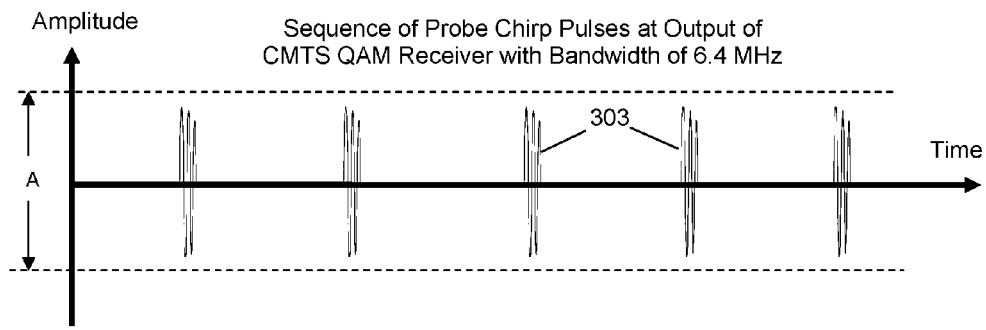

FIG. 3C shows chirp pulses 302 in a truncated condition and are referred to here as truncated chirp pulses 303. The condition of pulses 303 is created by a CMTS receiver for a 6.4 MHz QAM-64 signal. The plot in FIG. 3C is the output of the CMTS QAM receiver. The duration t and amplitude A of the chirp pulses are reduced at the output of the CMTS receiver due to a narrow bandwidth of the QAM receiver. This effect additionally reduces the influence or interference of chirp pulses 302 on upstream QAM service signals.

Returning to FIG. 1, probe signal 123 travels to a mismatched tap 109, which causes a reflected probe signal 124 to be generated, and reflected probe signal 124 travels back to amp 107. Reflected probe signal 124 is received at Rx port 106 of TDR meter 101 and then digitized at ADC 117. Digital samples of reflected probe signal 124 are transferred from ADC 117 to a matched filter 116. A peak in the output response of matched filter 116, representing the reflected probe signal at tap 109, is then detected in a controller 118. The output response of matched filter 116 may be displayed on a display 119, from which a user can read the level and time delay of reflected probe signal 124 and a distance to mismatched tap 109. A keypad 115 is used to setup the mode (i.e., CW calibration or working probe signal) of TDR meter 101 and select or input the velocity of propagation (VOP) or VOP factor of cable 127.

The scenario of detecting mismatches in the drop line is also illustrated at FIG. 1. In this scenario, TDR meter 101 is connected via an external circulator 125 to a connector used for connecting to the RF input of CM 111. This means that CM 111 is temporarily disconnected from the network, while TDR meter 101 is connected. As shown by dotted lines in FIG. 1, a probe signal is transmitted from TDR meter 101 to a mismatched drop device 110 and a reflected probe signal (caused by the mismatch) travels back to meter 101 via circulator 125. The reflected signal is received at Rx port 106 and then processed as previously discussed with respect to reflected probe signal 124. This scenario is similar to a home certification testing procedure or protocol. Specific to this scenario is that control over the transmit level of the probe signal relative to the level of the QAM service signals is not performed. Therefore, to prevent interference by the probe signal with QAM signals at the CMTS, the transmit level of the probe signal is set to about −35 dBc to −40 dBc, relative to the expected minimum QAM signal level at CM 111. For example, if the minimum QAM signal level at CM 111 is +40 dBmV, then the output or transmit level of the TDR probe signal should be set to 0 dBmV.

It should be noted that in both scenarios, TDR meter 101 generates a sequence of chirp probe pulses 302 during a short period of time, e.g., about 1 second. This period is enough for the detection of the reflected probe signal with very good sensitivity. And, due to the short period of probe signal transmission, the risk of interference with QAM service signals is additionally reduced.

The next issue to discuss is how to detect the reflected probe signal where a low-level probe signal is used in the presence of high level upstream QAM service signals. A solution is illustrated on FIG. 4. It is known that time domain multiplexing (TDM) is used to transmit a number of QAM burst signals 401 in the return path. This means that it is possible to pick free time intervals 402, when no burst signals 401 are transmitted in the upstream path. Free time intervals 402 are already widely used for analysis of the (noise and interference) spectrum under the QAM signals (Noise-under-QAM mode) in the return path. For example, FIG. 2 shows an actual Noise-under-QAM spectrum 204 received at the headend of the HFC network in the presence of four upstream QAM channels 201. The headend is a point of maximum QAM traffic (i.e., traffic converges at the headend). However, if the noise-under-QAM spectrum is viewed at one of the coaxial legs at the output of a fiber node, then the QAM traffic is reduced at least by two times (fiber node with two outputs). And, if the noise-under-QAM spectrum is viewed at some bi-directional amplifier in one of the node branches, then the QAM traffic is even further reduced. Thus, in the scenario where TDR meter 101 is coupled to trunk line 127 (FIG. 1), there will be plenty of free time intervals 402 for detection of reflected probe signals. An object of the present invention is to maximize the use of (exploit) time intervals 402 for detection.

Figure 4:
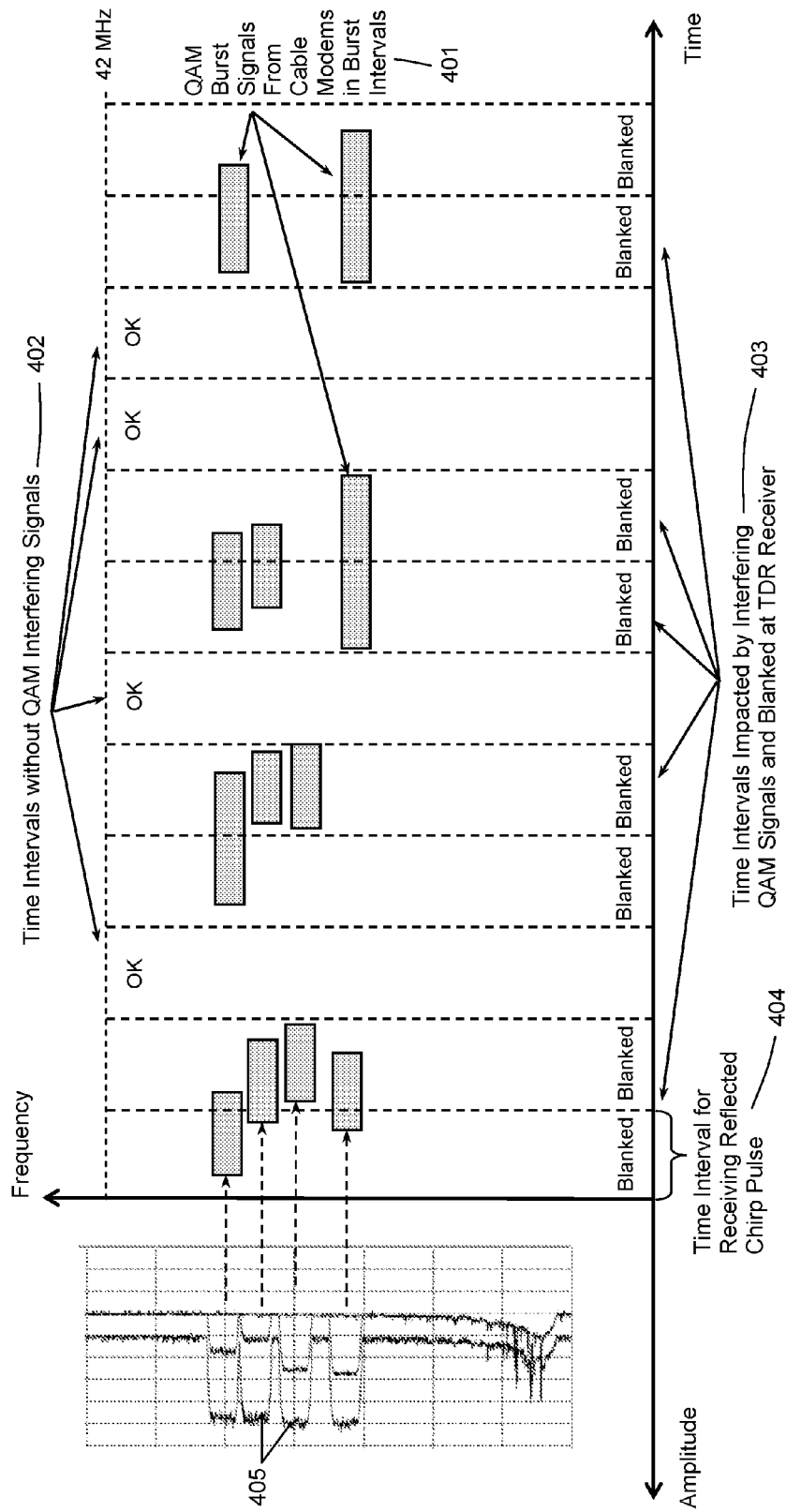
FIG. 4 is a three-dimensional amplitude-frequency-time domain diagram showing burst QAM signals transmitted, during burst intervals from CMs, in the upstream path of an HFC network, and showing the time domain divided into receiving intervals, some of which overlap burst signals (and are blanked) and some of which are free of burst signals.

It is easier to exploit free time intervals 402 if the duration for receiving the reflected probe signal is minimized (see FIG. 4, identifying this duration as a "receiving interval" 404). A coherent sequence of short chirp pulses (e.g., signal 302 in FIG. 3B) is selected for this purpose. As previously indicated, and as shown on FIG. 4, some of receiving intervals 404 are occupied or impacted by QAM burst signals 401 (the occupied/impacted intervals are identified as intervals 403 in FIG. 4). Thus, receiving intervals 404 include both free (or quiet) intervals 402 and occupied (or impacted) intervals 403. At the receive end of TDR meter 101, occupied intervals 403 should be blanked, meaning that the signals received during such receiving intervals (probe and QAM) are not utilized in the detection process (e.g., not accumulated for matched filter 116). Blanking eliminates interference by QAM signals in the detection of the probe signals (e.g., short chirp pulses). Even though a number of receiving intervals 404 are occupied or impacted by QAM signals, the probability of exploiting enough free intervals 402 for very sensitive detection is relatively high in practice (experience shows no less then 10%). Even if only 10% of receiving intervals 404 are used for detection of reflected probe signals, the sensitivity of detection will be more than adequate and quite good. The sensitivity is achieved, in part, due to a coherent accumulation of the reflected probe pulses before processing in the matched filter (see FIG. 5).

Figure 5:
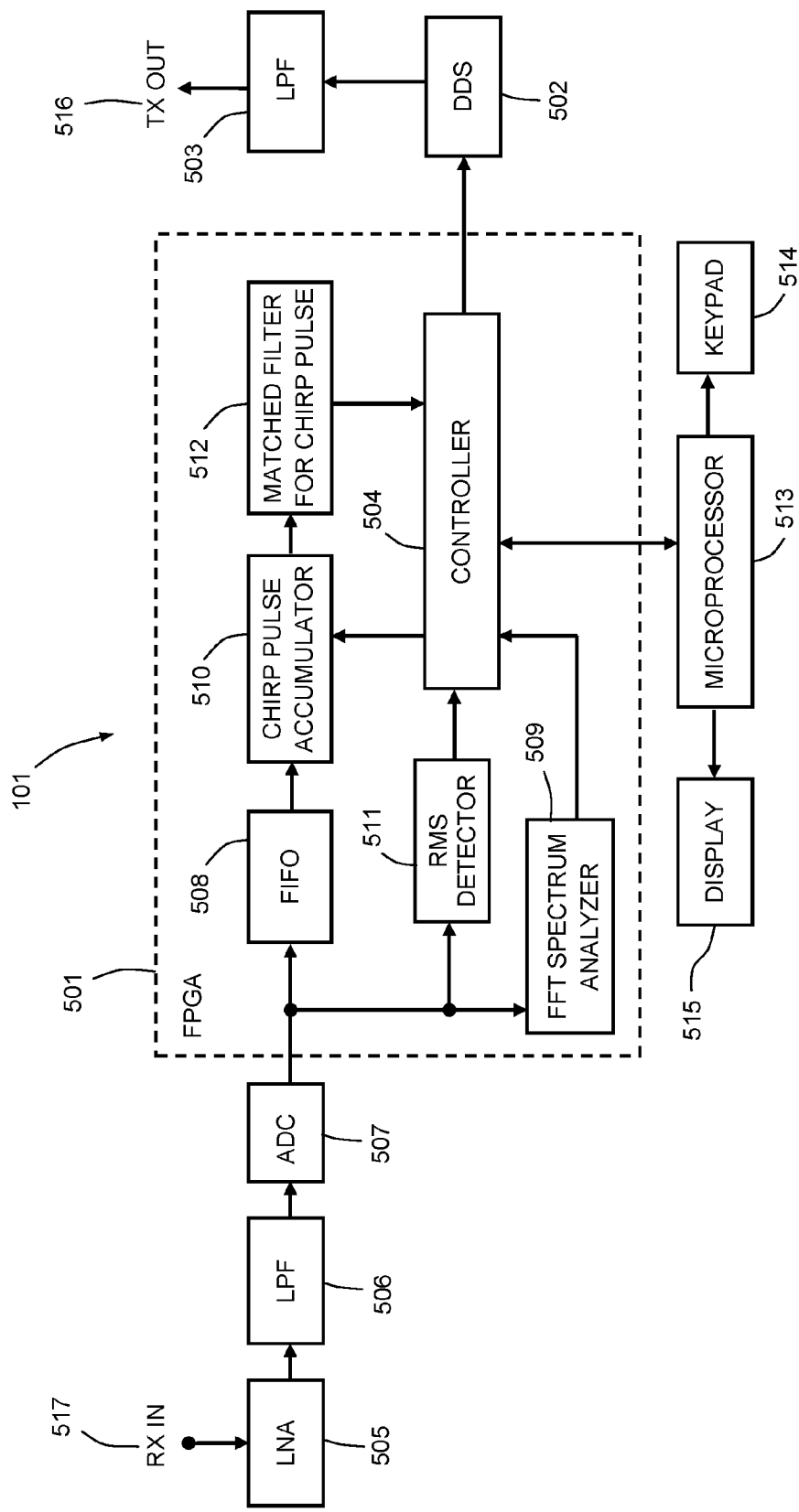
FIG. 5 is a block diagram of the TDR meter according to one embodiment of the present invention.

Referring now to FIG. 5, there is shown a block diagram of TDR meter 101. The CW test signal and coherent chirp pulses (transmit signal) are generated by a direct digital synthesizer (DDS) 502 controlled by a controller 504. Controller 504 is configured in a field programmable gate array (FPGA) 501. The transmit signal from DDS 502 is filtered in low pass filter (LPF) 503 and then exits TDR meter 101 at a transmit (Tx) output port 516. The reflected probe pulses and leak of CW test signal are received at a receive (Rx) port 517. Rx port 517 is connected to an input of a low noise amplifier (LNA) 505, and an output of LNA 505 is connected to an input of an LPF 506. The output of LPF 506 is connected to an input of an ADC 507. The output of ADC 507 is digital samples and they are received by FPGA 501. In the CW test signal mode, the leak signal samples from ADC 507 are received by an FFT spectrum analyzer 509 (realized in FPGA 501). The spectrum of the samples created by analyzer 509 is then received by controller 504, which sets the output or transmit level of DDS 502 relative to the level of the QAM signals in the return band (as previously discussed). In the probe signal mode, the reflected chirp pulses received at Rx port 517 are sampled by ADC 507 and the samples are received by a first-in-first-out (FIFO) memory unit 508 (which functions as a time delay line). The chirp pulse samples are also received by a Root Mean Square (RMS) detector 511.

When TDR meter 101 is in the probe signal mode, controller 504 initially (within a few seconds) collects statistical data about the RMS level of return band signals received at Rx port 517. DDS 502 is switched off during this period of RMS level measurement by detector 511 and statistical data collection by controller 504. Then, FPGA controller 504 sets up an RMS level threshold used in making a decision about the presence or absence of QAM signals during the probe signal mode. This RMS level threshold is about 3 dB above the minimum RMS level measured from the collected statistics (covering receiving intervals that are occupied and unoccupied by QAM signals). So, if the RMS level detected by detector 511 is higher than the RMS level threshold, then the signal samples at the output of FIFO memory 508 are blanked (not accumulated) in a coherent accumulator 510. If the RMS level is lower than the RMS level threshold, then the signal samples from FIFO memory 508 are coherently accumulated in accumulator 510. After a predetermined period of time (e.g., about one second) the accumulated signal (chirp pulses) in accumulator 510 is normalized (i.e., divided by the number of accumulated pulses) and the normalized accumulated signal is sent to a matched filter 512 configured for detecting the chirp probe pulses. Accumulator block 510 and matched filter block 512 constitute nothing more than a matched filter for a coherent sequence of chirp pulses (e.g., signal 302 in FIG. 3B), except that reflected chirp pulses impacted by strong interfering QAM signals are blanked and do not obscure the detection in matched filter 512. The matched filter block 512 for chirp pulse detection is well-known and can be realized in the time or frequency domain or as a combination de-chirp mixer and FFT processor.

The output response from matched filter 512 (FIG. 6) is sent to FPGA controller 504 and then to a microprocessor 513. The response may then be displayed on a display 515. Microprocessor 513 is also connected to a keypad 514, which is used by an operator to set parameters and switch between modes of operation in TDR meter 101 (e.g., CW test mode, working probe signal mode, trunk line measurement mode, and drop line measurement mode).

Figure 6:
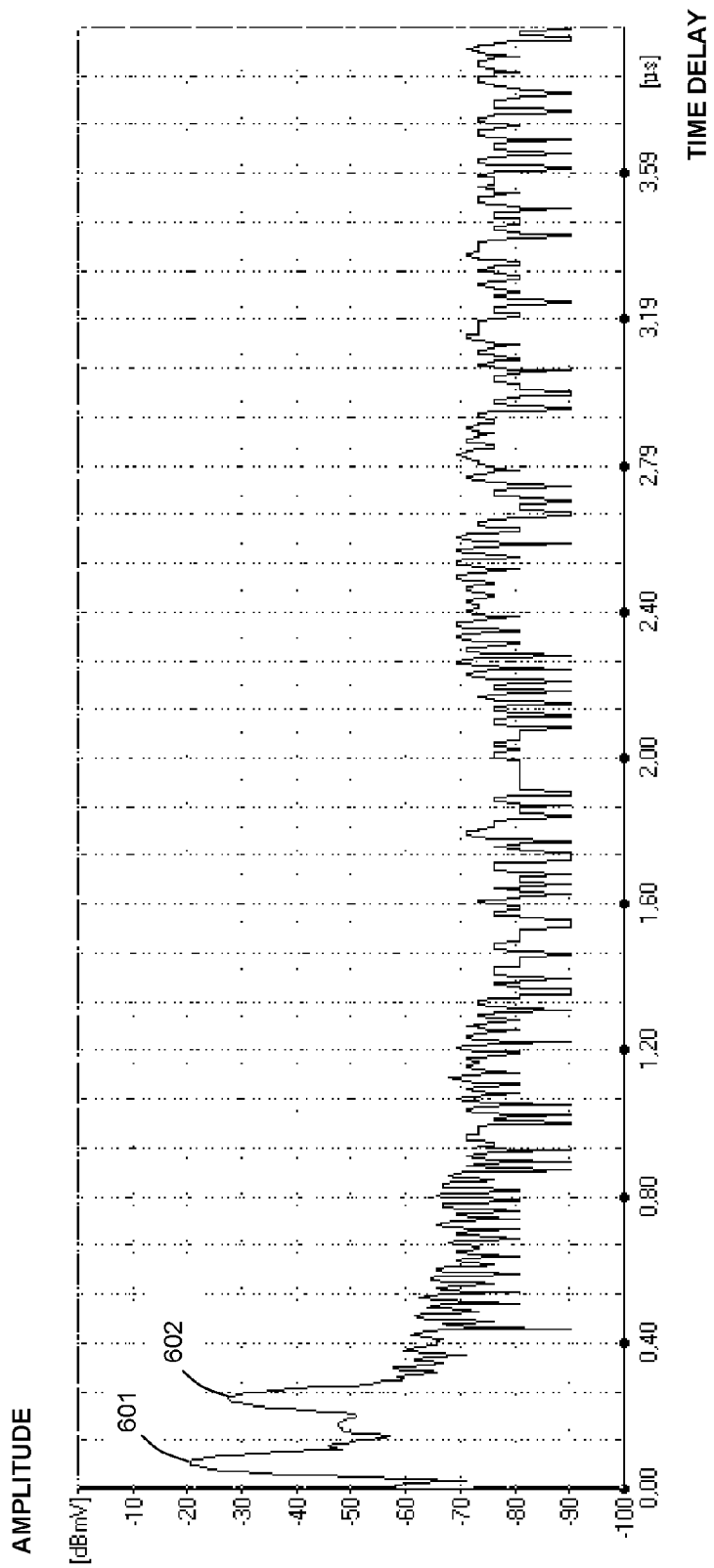
FIG. 6 is an amplitude-versus-time delay plot representing the output of a matched filter in the TDR meter of FIG. 5, illustrating a detection of an impairment (602) and an estimation of a time delay associated with the impairment.

A typical response of matched filter 512 is shown in FIG. 6. This is an actual response measured in a lab test under the following conditions:
  Device under test: RG-6 cable, 70 feet long, and 75 ohm termination at one end;
  Tx chirp signal level in tested cable: 0 dBmV;
  Chirp pulse bandwidth: 5-42 MHz;
  Chirp pulse duration t: 10 microseconds;
  Chirp pulse period T: 20 microseconds;
  Number of accumulated chirp pulses: 8,192;

Maximum signal level at Rx port 517: +20 dBmV, which is actual QAM signal level at test port 104 of return amp 102 (FIG. 1).

Note, setting the dynamic range of ADC 507 to accommodate a maximum signal level +20 dBmV means reducing the sensitivity of detection of the reflected probe signal. But, this was intentionally done to simulate actual conditions of TDR meter 101 connected to a bi-directional amp.

The response in FIG. 6 has a first peak 601 close to zero time delay due to a leak of the probe signal into Rx port 517 of TDR meter 101 (FIG. 5). This leak signal has a level of about −20 dB relative to the transmit level of the probe signal into the tested cable. The offset of peak 601 from zero is the time delay of the probe signal between Tx and Rx ports (516 and 517 in FIG. 5). The second peak 602 corresponds to a reflected probe signal at the terminated end of the 70-foot RG-6 cable. The terminated end of the cable has a return loss of less than −20 dB, but TDR meter 101 easily detects the mismatch under the noise floor. Note from FIG. 6 that the response level at time delays greater than 1 microsecond ("noise floor") is established by side lobes of peak 601. Thus, for better "visibility" of reflected signal peaks, peak 601 (and its side lobes) can be removed by employing well-known gating methods. For example, see Agilent Time Domain Analysis Using a Network Analyzer, App. Note 1287-12, May 2, 2012, pp. 1-48, Agilent Technologies, Inc., http://cp.literature.agilent.com/litweb/pdf/5989-5723EN.pdf, incorporated herein by reference.

Figure 7:
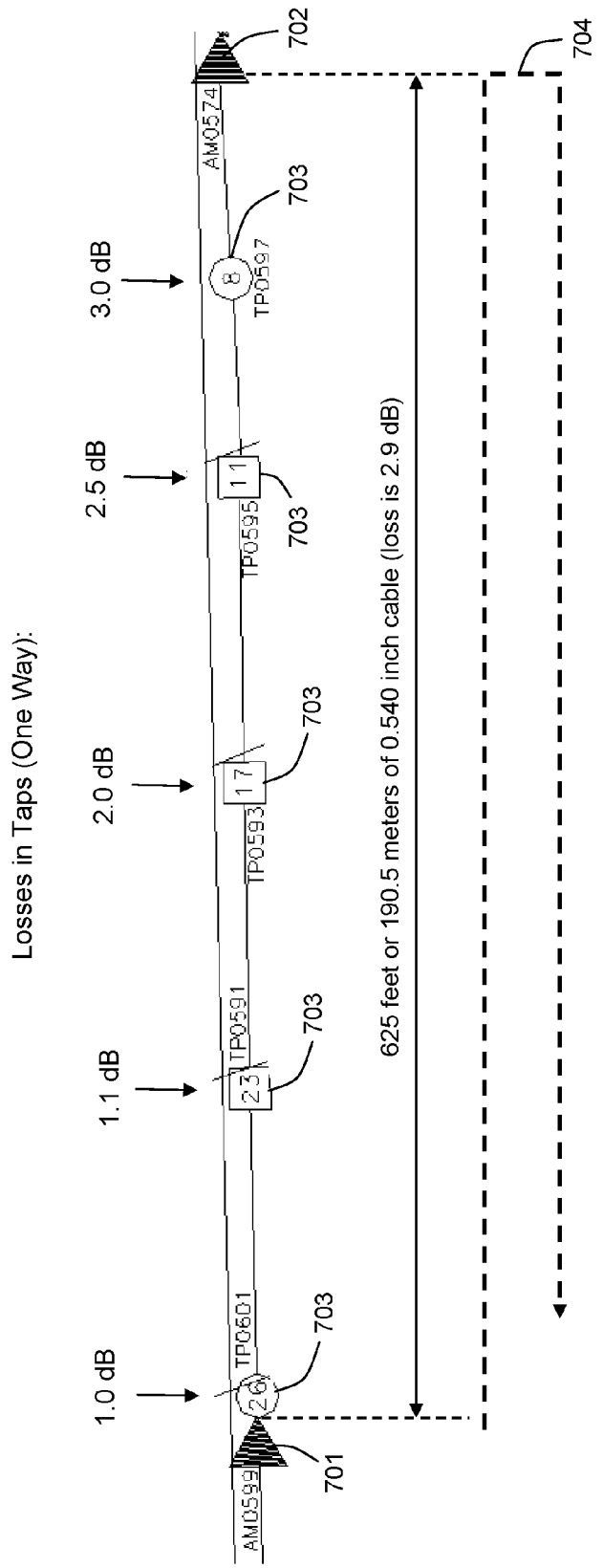
FIG. 7 is a typical branch line in a coaxial cable plant of an HFC network, between two cascaded bi-directional amplifiers, showing a typical length of the branch, the passive devices in the branch, losses in the cable and passive devices of the branch, and roundtrip time delay and losses.

The parameters for the short chirp probe pulses and the detection sensitivity of TDR 101 will now be discussed. In FIG. 7, a typical branch of a coaxial cable network is shown between two cascaded bi-directional amplifiers 701 and 702. Typically, there are five passives 703 (i.e., passive devices, such as subscriber taps) between amps 701 and 702, and the distance between amps 701 and 702 is about 200 meters. The loss or attenuation experienced by a probe signal 704 at the upstream frequencies (e.g., 5-42 MHz) in passives 703 are shown in FIG. 7 (above each passive). The total loss of passives 703 traveling in one direction is 9.6 dB. In the case of a 0.540 inch trunk cable, the loss in the cable (about 656 feet) is about 2.9 dB. Therefore, the round trip loss of probe signal 704 between amp 701 and amp 702 will be about [2×(9.6 dB+2.9 dB)]=25 dB (assuming no return loss in amp 702). The time delay of probe signal 704 at this distance, assuming a velocity of propagation factor of 0.88 (i.e., 88% of free-space speed of light) for the trunk cable, is about 1.5 microseconds. However, in some installations, the distance between cascaded bi-directional amplifiers is greater than 656 feet, but generally not more than twice this distance. Thus, the worst case roundtrip loss for the probe signal will be 6 dB higher (31 dB total) due to the extra loss in a cable twice as long. So, it is reasonable to expect the maximum time delay of the reflected probe signal to be no more than 3 microseconds and the maximum roundtrip loss to be no more than about 31 dB.

Tests in an actual HFC network have demonstrated that effective exploitation of free receiving intervals (free from QAMs) for detection in the return band is possible if the receiving interval (i.e., time necessary to receive probe signal) is no more then 10 to 15 microseconds. So, if the maximum time delay of the reflected signal is 3 microseconds, then the duration t of a chirp pulse (e.g., duration 304 in FIG. 3B) should be no more than (10 to 15)−3=7 to 12 microseconds. The period T (e.g., period 305 in FIG. 3B) of the chirp pulses should also be minimized, but should not be less than the receiving interval (10 to 15 microseconds).

Suppose that duration "t" (e.g., duration 304 in FIG. 3B) of a chirp pulse is 7 microseconds and the period T (e.g., period 305 in FIG. 3B) is 20 microseconds, and the total receiving (or accumulation) time is 1 second. The total number of reflected chirp pulses received by TDR 101 in this case will be 1 sec/20 microseconds=50K. Also suppose that only 10% of the reflected chirp pulses received by TDR 101 are received during a free receiving interval. Then, the number of received and accumulated reflected chirp pulses in accumulator 510 (FIG. 5) will be 50K/10=5000, and the total duration of accumulated reflected probe pulses will be 5000×7 microseconds=35 milliseconds. The sensitivity of matched filter 512 (FIG. 5) in detecting accumulated chirp pulses having a total pulse duration of 35 milliseconds is approximately the sensitivity of a receiver with a bandwidth of 1/35 milliseconds=28 Hz. The potential sensitivity of such a receiver is 174 dBm/Hz−10 log (28)=159 dBm or about −110 dBmV. If a very large noise figure is assumed for TDR meter 101 (e.g., 20 to 40 dB), then the sensitivity should be at least −70 dBmV. This minimum sensitivity is much better than the expected minimum level of the received reflected probe signal of −29 dBmV (assuming no return loss at mismatched device; see FIG. 8 discussion below). Therefore, the sensitivity of TDR meter 101 should be enough to measure the return losses of the farthest device within a dynamic range of up to −41 dB (−70+29). This range is more than enough for detecting micro-reflections caused by mismatched devices, because the typical return losses in the mismatched devices are in the range of about 10 to 15 dB.

The sensitivity of TDR meter 101 is also confirmed by the actual test results in FIG. 6, which shows an achievable sensitivity of at least −70 dB, and probably much better than −70 dB if a gating algorithm (mentioned above) is used to remove peak 601 and its side lobes. Such gating techniques are well-known to those of ordinary skill in the art and thus are not further discussed here.

Consider the bandwidth-times-duration (B*t product) of chirp pulses used in the illustrated embodiment of the present invention. It is generally understood that this parameter is a measure of the robustness of the signal in a noise environment. The higher the B*t product, the more robust the signal is in noise. In the embodiment described herein, the bandwidth of the pulse is 42 MHz−5 MHz=37 MHz and the duration t is, e.g., 7 microseconds. Thus, in this example, the B*t=259. However, as indicated above, 5000 pulses are accumulated over a 1-second total receiving time. Thus, the effective B*t over the total receiving time is 259×5000=1.295 M, which suggests a very robust signal in the noise and signal environment of an HFC network. In another example being tested, 16000 pulses are accumulated over the total receiving time and the duration t of each pulse is 16 microseconds. The effective B*t product in the latter example is 37 MHz×16 microseconds×16000≈9.5 M. In another example being tested (a "high noise-suppression" mode), the accumulated pulses are increased by 8 times. Thus, the B*t product equals 9.5 M×8≈76 M. Detection sensitivities of −90 dBmV have been achieved in tests.

Another important parameter of TDR meter 101 is time-distance resolution and accuracy for locating mismatches. For chirp pulses each having a full return bandwidth of 5-42 MHz, the time-distance resolution will be about 1/(42−5 MHz)=27 nanoseconds or 3.5 meters (11.5 feet), using a velocity of propagation factor of 0.88 for trunk line cable. In the case of a middle-split spectrum, where the return bandwidth is 5-85 MHz, the resolution will be 12.5 nanoseconds or 1.65 meters (5.4 feet). The accuracy of locating mismatches will be, at times, even better and, in some cases, within 1 foot. A handheld TDR with such resolution and accuracy will be very helpful for locating and fixing mismatches in a coaxial cable plant.

Figure 8:
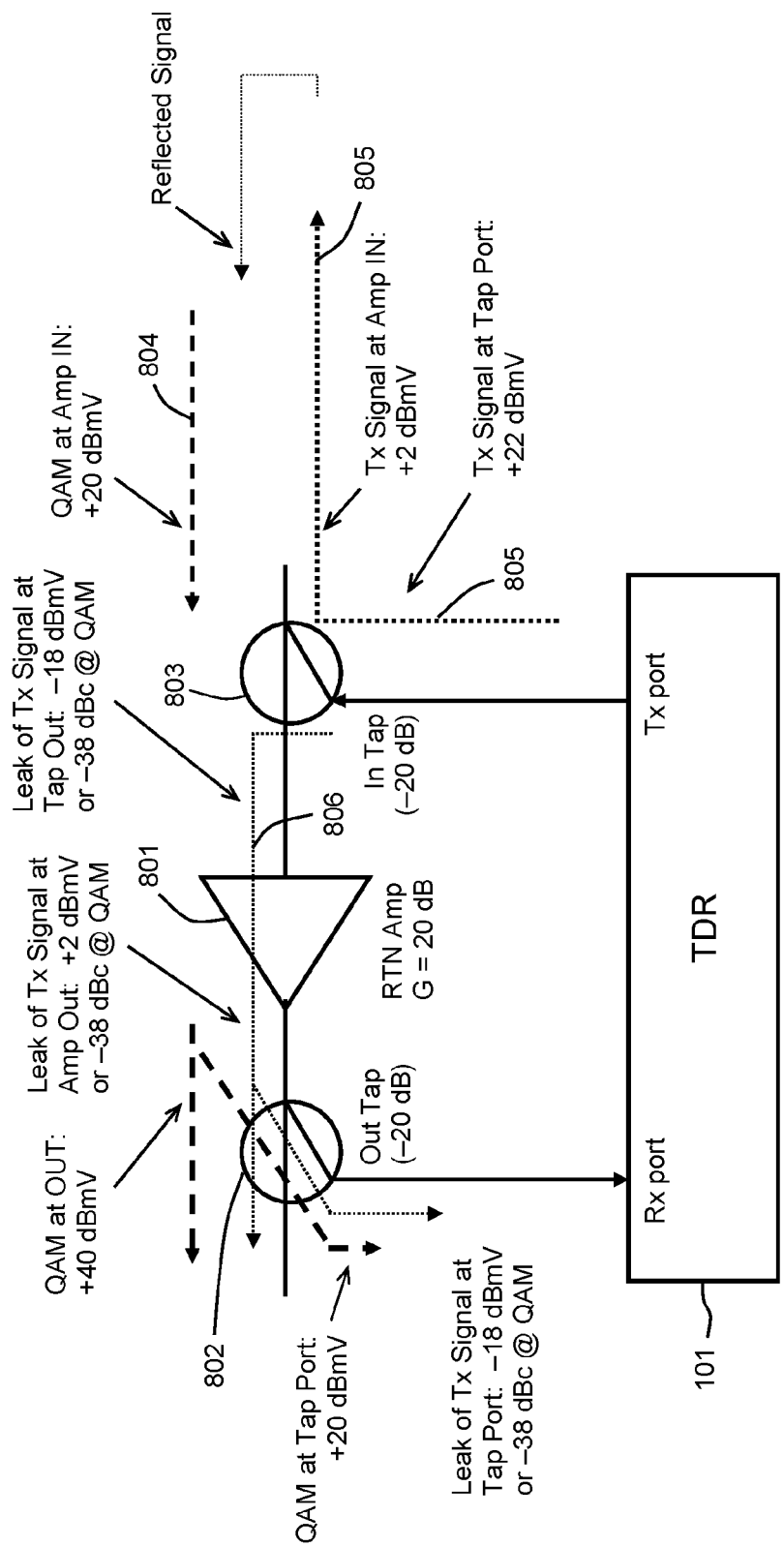
FIG. 8 is a block diagram illustrating the connection of the TDR meter of FIG. 5 to two test ports in a return path leg of a bi-directional amplifier, and showing signal levels of the probe signal, leak of the probe signal, and upstream QAM signal, at different points in the return path leg.

FIG. 8 shows typical signal levels of an upstream QAM signal 804 (from a CM) and a probe signal 805 (from TDR meter 101), at various points in a return leg of a bi-directional amplifier. The return leg includes a return amplifier 801, an input tap 803, and an output tap 802. The Tx port of TDR meter 101 is connected to a test port of input tap 803 and the Rx port of TDR meter 101 is connected to a test port of output tap 802. The typical level of QAM signal 804 at the input of tap 803 (and thus at the input of return amp 801) is about 20 dBmV. So, to provide a difference or ratio (or margin) of −38 dBc between QAM signal 804 and a leak signal 806 (of probe signal 805), leak signal 806 should have a level of −18 dBmV at the output (just upstream) of tap 803. Taking into account a typical −40 dB isolation for tap 803, the level of probe signal 805 at the test port of tap 803 (transmit level) should be: −18 dBmV+40 dB=22 dBmV. The level of probe signal 805 in the downstream direction (downstream of tap 803) will be: 22 dBmV−20 dB (test port loss)=2 dBmV. If the maximum (or worst case) roundtrip loss of probe signal 805 is 31 dB (as discussed above), then the expected minimum level of the reflected probe signal at the input of tap 803 will be: 2 dBmV−31 dB=−29 dBmV (or −49 dBc relative to QAM signal 804), plus any return loss in the farthest mismatched device.

Figure 9:
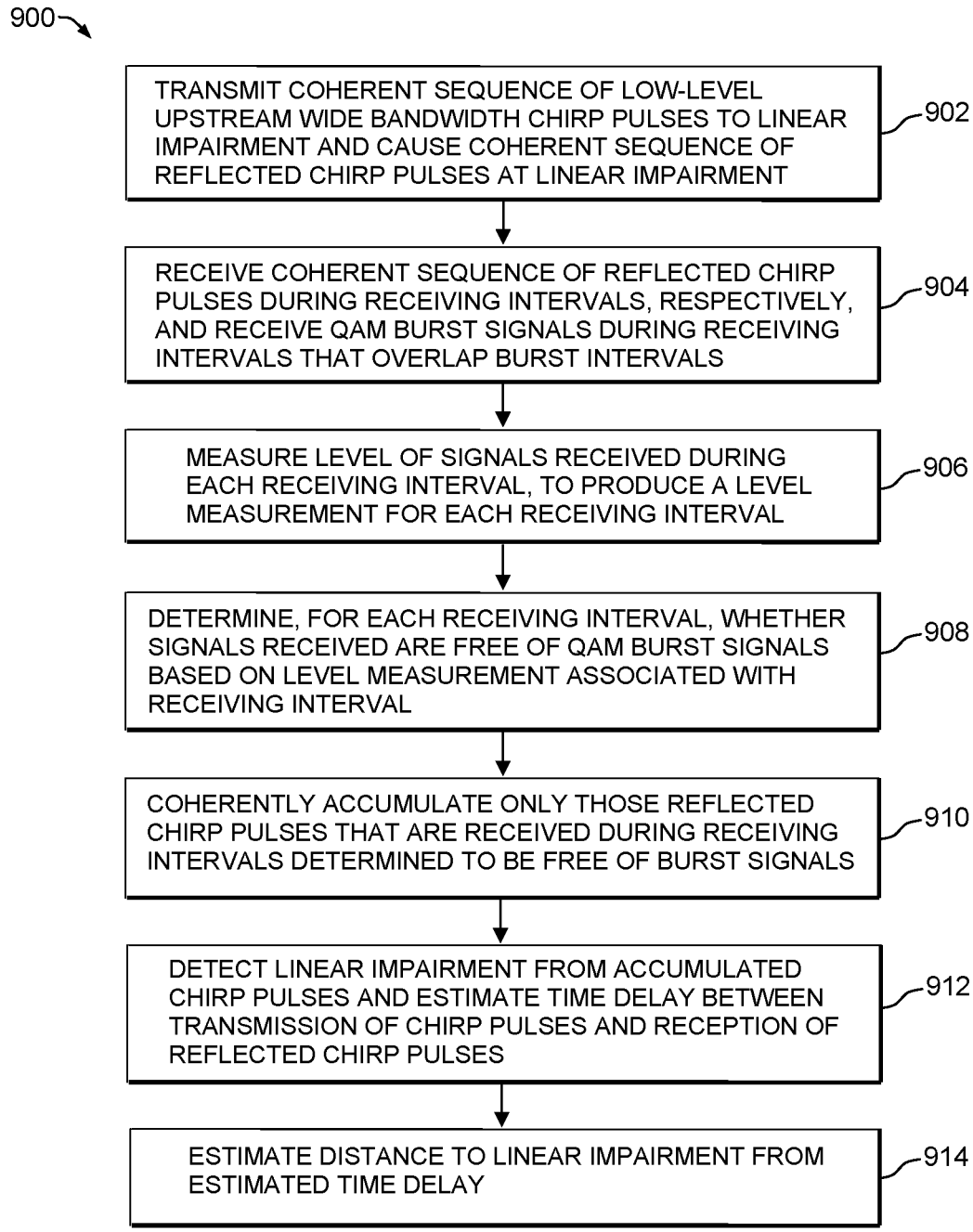
FIG. 9 is a flow diagram outlining a method of the present invention for locating a linear impairment in a coaxial cable portion of an HFC network.

Referring now to FIG. 9, a flow diagram outlines an exemplary method 900 of the present invention. Method 900 concerns locating a linear impairment in a coaxial cable portion of an HFC network (see FIG. 1). The coaxial cable portion carries QAM burst signals in an upstream frequency band (see FIG. 2). The QAM burst signals are transmitted in the cable portion only during burst intervals. In a first step 902, a coherent sequence of low-level, short chirp pulses (e.g., FIG. 3B) is transmitted (e.g., by TDR meter 101) to the linear impairment (e.g., tap 109 in FIG. 1), causing a coherent sequence of reflected chirp pulses at the linear impairment (FIG. 1). Each chirp pulse is defined by a band of frequencies within the upstream frequency band and has a bandwidth (a "wide bandwidth") that extends the width of the upstream frequency band (e.g., 5-42 MHz). In a step 904, each of the coherent sequence of reflected chirp pulses is received (FIG. 5; blocks 517, 505, 506, 507, & 508) during a receiving interval, and the QAM burst signals are received during the receiving intervals that overlap the burst intervals (see FIG. 4). In a step 906, a level of the signals received during each of the receiving intervals is measured (e.g., by RMS detector 511 in FIG. 5), to produce a level measurement for each receiving interval. In a step 908, a determination is made (e.g., by controller 504 in FIG. 5) for each receiving interval, whether the signals received are free of the QAM burst signals, based on the level measurement associated with the receiving interval. In a step 910, the reflected chirp pulses received during receiving intervals that were free of QAM burst signals are coherently accumulated (e.g., in chirp pulse accumulator 510 in FIG. 5). In a step 912, the linear impairment is detected from the accumulated chirp pulses (e.g., in matched filter 512 in FIG. 5) and a time delay between transmission of the chirp pulses and reception of the reflected chirp pulses is estimated (e.g., by controller 504; see also FIG. 6). Lastly, in a step 914, the distance to the linear impairment (e.g., between TDR 101 and tap 109 in FIG. 1) is estimated from the estimated time delay (e.g., by controller 504).

Figure 10:
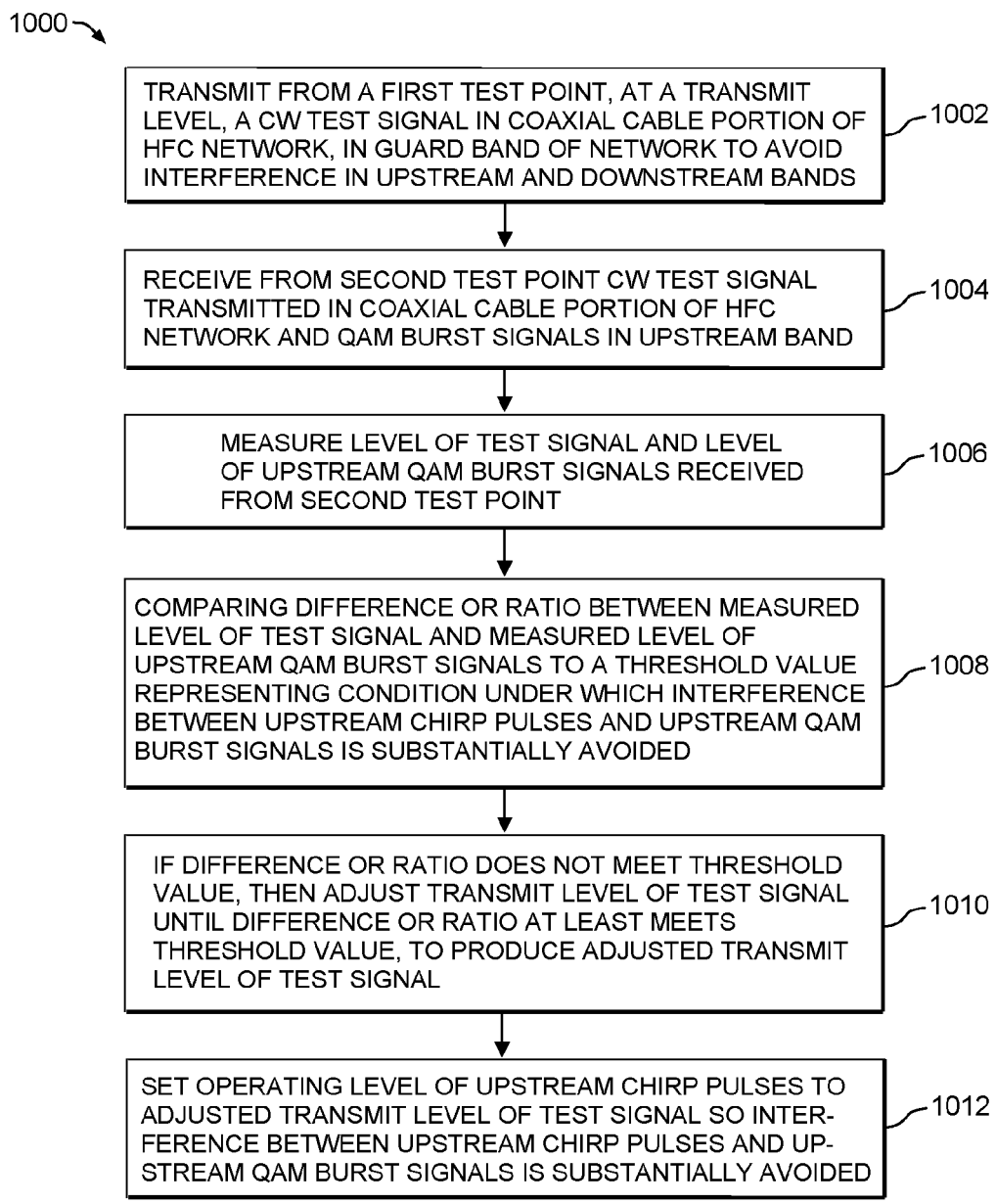
FIG. 10 is a flow diagram outlining a further method of the present invention, or an extension of the method of FIG. 9, directed to calibrating or setting an operating level of a probe signal used by the TDR meter of FIG. 5, where the operating level is calibrated or set to a level that substantially avoids interference with upstream QAM signals.

An extension or modification of method 900 is shown in FIG. 10 as a method 1000. Method 1000 concerns the calibration or setting of an operating level of the chirp pulses used in method 900. In the HFC network under test, the upstream frequency band is separated from a downstream frequency band by a guard band. In a first step 1002 of method 1000, a narrow band test signal, and preferably a CW test signal (FIG. 3A), is transmitted (e.g., from TDR 101) in the coaxial cable portion of the HFC network from a first test point (FIG. 1), at an initial transmit level and in the guard band (to avoid interference in the upstream and downstream bands). In a second step 1004, the transmitted test signal in the guard band and QAM burst signals in the upstream band are received (e.g., by TDR 101) at a second test point (FIG. 1) in the coaxial cable portion of the network. In a third step 1006, the level of the test signal and the level of the upstream QAM burst signals, received from the second test point, are measured (e.g., by FFT spectrum analyzer 509 in FIG. 5). FIG. 2 shows the CW test signal and the QAM burst signals at the output of analyzer 509 (or analyzer 114). In a fourth step 1008, a difference or ratio between the measured level of the test signal and the measured level of the QAM burst signals is compared to a threshold value (e.g., −25 dBc, −30 dBc, −38 dBc, etc.). This step is performed by controller 504 (FIG. 5). The threshold value represents a condition under which interference between chirp probe pulses and QAM burst signals is substantially avoided upstream of the test points, particularly at the CMTS's. In a fifth step 1010, if the difference or ratio does not meet the threshold value, then the transmit level of the test signal is adjusted until the difference or ratio at least meets the threshold value. Controller 504 performs this step and controls DDS 502 to make adjustments to the transmit level of the test signal. A final "adjusted transmit level" is produced once controller 504 determines that the difference or ratio at least meets the threshold value. Lastly, in a sixth step 1012, the operating level of the chirp pulses (to be transmitted in the upstream band) is set to the adjusted transmit level of the test signal. This step is performed by controller 504 controlling DDS 502. By setting the operating level of the chirp pulses to the adjusted transmit level, interference between the chirp pulses and the QAM burst signals is substantially avoided upstream at the CMTS's.

The various functions of the present invention, as described above, may be implemented in hardware, firmware, software, or a combination of these. For example, with respect to hardware, these functions may be implemented in an application specific integrated circuit (ASIC), digital signal processor (DSP), field programmable gate array (FPGA), micro-controller, microprocessor, programmable logic device, general purpose computer, special purpose computer, other programmable electronic device, or a combination of these devices (hereinafter "processor"). If the various functions are implemented in firmware, software, or other computer-executable instructions, then they may be stored on any suitable computer-readable media. Computer-executable instructions may cause a processor and other associated hardware to perform the aforementioned functions of the present invention. Computer-executable instructions include data structures, objects, programs, routines, commands, or other program modules accessible and executable by a processor. The computer-readable media may be any available media accessible by a processor. Embodiments of the present invention may include one or more computer-readable media. Generally, computer-readable media include, but are not limited to, random-access memory ("RAM), read-only memory ("ROM), programmable read-only memory ("PROM), erasable programmable read-only memory ("EPROM), electrically erasable programmable read-only memory ("EEPROM"), compact disk read-only memory ("CD-ROM), flash memory, or any other device or component that is capable of providing data or executable instructions accessible by a processor. Certain embodiments recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A time domain reflectometer for locating an impairment in a coaxial cable portion of a hybrid fiber-coax (HFC) network, the coaxial cable portion being characterized by a velocity of propagation and carrying a plurality of burst signals in an upstream frequency band during a plurality of burst intervals, respectively, said time domain reflectometer comprising:
    (a) a transmitter, to be coupled to the HFC network at a distance from the impairment, for transmitting over the distance to the impairment a plurality of low-level probe signals in the upstream frequency band during a plurality of receiving intervals, respectively, the impairment causing a reflection of the plurality of probe signals in the form of a plurality of reflected probe signals, which travel back over the distance towards said transmitter;
    (b) a receiver, to be coupled to the HFC network, for receiving the plurality of reflected probe signals during the plurality of receiving intervals, respectively, and for receiving the plurality of burst signals during a number of the plurality of receiving intervals that overlap in time with the plurality of burst intervals;
    (c) a level detector, coupled to said receiver, for measuring a level of the signal or signals received by said receiver during each of the receiving intervals, such that a plurality of level measurements are made for the plurality of receiving intervals, respectively;
    (d) a controller, coupled to said level detector, for determining which of the plurality of receiving intervals are substantially free of the burst signals based on the plurality of level measurements;
    (e) an accumulator, coupled to said receiver and to said controller, for accumulating substantially only the reflected probe signals received during the receiving intervals that have been determined to be substantially free of the burst signals; and
    (f) an impairment detector, coupled to said accumulator, for detecting the impairment from the accumulated reflected probe signals and estimating from the detection a time delay between the transmission of the probe signals by said transmitter and the reception of the reflected probe signals by said receiver,
    whereby a value of the distance to the impairment is estimated from the time delay and the velocity of propagation of the coaxial cable portion of the HFC network.

2. The time domain reflectometer of claim 1, wherein each of the plurality of low-level probe signals has a band of frequencies extending substantially over the width of the upstream frequency band.

3. The time domain reflectometer of claim 2, wherein the plurality of low-level probe signals are a plurality of chirp pulses, respectively, the reflection of the plurality of low-level probe signals being in the form of a plurality of reflected chirp pulses.

4. The time domain reflectometer of claim 3, wherein the upstream frequency band is from about 5 MHz to about 42 MHz, and wherein each of the plurality of chirp pulses is defined by a band of frequencies from about 5 MHz to about 42 MHz.

5. The time domain reflectometer of claim 3, wherein each of the plurality of chirp pulses is an up-chirp pulse.

6. The time domain reflectometer of claim 3, wherein each of the plurality of chirp pulses is defined by a pulse duration, and wherein the pulse duration of each chirp pulse is in a range of about 7 microseconds to about 12 microseconds.

7. The time domain reflectometer of claim 1, wherein the plurality of receiving intervals together span a total time period of at least one second.

8. The time domain reflectometer of claim 1, wherein each of the plurality of receiving intervals is in a range of about 10 microseconds to about 15 microseconds.

9. The time domain reflectometer of claim 1, wherein the impairment is a linear impairment.

10. The time domain reflectometer of claim 1, wherein said controller is adapted to determine which of the plurality of receiving intervals are substantially free of the burst signals based on a comparison of the level measurements made for the receiving intervals with a predetermined threshold.

11. The time domain reflectometer of claim 10, wherein said level detector is adapted to measure a level of an initial number of burst signals, carried by the coaxial cable portion of the HFC network in the upstream frequency band, to determine the predetermined threshold.

12. The time domain reflectometer of claim 1, wherein the coaxial cable portion of the HFC network includes a bi-directional amplifier located upstream of the impairment, the bi-directional amplifier having an upstream leg, the upstream leg having a return amplifier, an input tap at an input of the return amplifier, and an output tap at an output of the return amplifier, the input tap having an input test port and the output tap having an output test port,
    and wherein said transmitter is to be coupled to the input test port of the input tap and said receiver is to be coupled to the output test port of the output tap, such that, once coupled, said transmitter transmits the plurality of probe signals through the input tap to the impairment and said receiver receives the plurality of reflected probe signals from the output tap.

13. The time domain reflectometer of claim 1, wherein said impairment detector is adapted to produce an output response from the accumulated reflected probe signals, the output response having an amplitude peak from which the impairment is detected.

14. The time domain reflectometer of claim 13, wherein said controller is coupled to said impairment detector and is adapted to determine a return loss value of the impairment from the amplitude peak of the output response.

15. The time domain reflectometer of claim 1, wherein said impairment detector includes a matched filter configured to detect the impairment from the accumulated reflected probe pulses.

16. A method of locating an impairment in a coaxial cable portion of a hybrid fiber-coax (HFC) network, the coaxial cable portion being characterized by a velocity of propagation and carrying a plurality of burst signals in an upstream frequency band during a plurality of burst intervals, respectively, said method comprising the steps of:

(a) transmitting in the coaxial cable portion of the HFC network, over a distance to the impairment, a plurality of low-level probe signals in the upstream frequency band during a plurality of receiving intervals, respectively, the impairment causing a reflection of the plurality of probe signals in the form of a plurality of reflected probe signals, which travel back over the distance;

(b) receiving the plurality of reflected probe signals during the plurality of receiving intervals, respectively, and receiving the plurality of burst signals during a number of the plurality of receiving intervals that overlap in time with the plurality of burst intervals;

(c) measuring a level of the signal or signals received in step (b) during each of the receiving intervals, such that a plurality of level measurements are made for the plurality of receiving intervals, respectively;

(d) determining which of the plurality of receiving intervals are substantially free of the burst signals based on the plurality of level measurements;

(e) accumulating substantially only the reflected probe signals received during the receiving intervals that have been determined to be substantially free of the burst signals;

(f) detecting the impairment from the accumulated reflected probe signals and estimating from the detection a time delay between the transmission of the probe signals in step (a) and the reception of the reflected probe signals in step (b); and (g) estimating a value of the distance to the impairment from the time delay and the velocity of propagation of the coaxial cable portion of the HFC network.

17. The method of claim 16, wherein the coaxial cable portion of the HFC network contains first and second test ports located upstream from the impairment, and wherein:

step (a) includes transmitting the plurality of low-level probe signals through the first test port at a probe signal transmit level; and step (b) includes receiving the plurality of reflected probe signals and the burst signals through the second test port.

18. The method of claim 17, wherein the coaxial cable portion of the HFC network operates using a frequency spectrum including the upstream frequency band and a guard band, and wherein the first test port leaks a portion of the plurality of low-level probe signals transmitted in step (a) to create a corresponding plurality of leak probe signals, the leak probe signals substantially interfering with reception of the burst signals, upstream of the first and the second test ports, unless a level of the leak probe signals is less than a level of the burst signals by at least a predetermined threshold, the method of claim 16 further comprising the steps of:

(h) through the first test port, transmitting a narrowband test signal at a test level into the coaxial cable portion of the HFC network, the test signal being located in the guard band to substantially avoid interference with the burst signals in the upstream frequency band, the first test port leaking a portion of the test signal to create a leak test signal;

(i) through the second test port, receiving the leak test signal and the burst signals from the coaxial cable portion of the HFC network;

(j) measuring a level of the leak test signal and a level of the burst signals received in step (i), to produce a leak test level and a burst signal level, respectively;

(k) determining whether a condition is met that the leak test level is less than the burst signal level by at least the predetermined threshold;

(l) if the condition in step (k) is not met, adjusting the test level in step (h) and repeating steps (h) through (k) until the condition in step (k) is met; and (m) if the condition in step (k) is met, adjusting the probe signal transmit level in step (a) based on the test level that resulted in the condition being met, whereby interference by the leak probe signals with reception of the burst signals upstream of the first and the second test ports is substantially avoided.

19. The method of claim 16, wherein step (d) is performed by comparing each of the level measurements with a predetermined threshold, and if a particular level measurement of the level measurements is below the predetermined threshold, it is determined that the receiving interval associated with the particular level measurement is substantially free of the burst signals.

20. The method of claim 19, further comprising the steps of:

(h) receiving, in the upstream frequency band, an initial number of burst signals from the coaxial cable portion of the HFC network; and (i) measuring a level of the initial number of burst signals to determine the predetermined threshold.

21. The method of claim 16, wherein step (f) includes producing an output response from the accumulated reflected probe signals, the output response having an amplitude peak from which the impairment is detected.

22. The method of claim 21, further comprising the step of determining a return loss value of the impairment from the amplitude peak of the output response.

23. The method of claim 16, wherein each of the plurality of low-level probe signals has a band of frequencies extending substantially over the width of the upstream frequency band.

24. The method of claim 23, wherein the plurality of low-level probe signals are a plurality of chirp pulses, respectively, the reflection of the plurality of low-level probe signals being in the form of a plurality of reflected chirp pulses.

25. The method of claim 24, wherein each of the plurality of chirp pulses is defined by a pulse duration, and wherein the pulse duration of each chirp pulse is in a range of about 7 microseconds to about 12 microseconds.

26. The method of claim 16, wherein each of the plurality of receiving intervals is in a range of about 10 microseconds to about 15 microseconds.

27. A method of locating an impairment in a coaxial cable portion of a hybrid fiber-coax (HFC) network, the coaxial cable portion being characterized by a velocity of propagation and carrying a plurality of burst signals in an upstream frequency band during a plurality of burst intervals, respectively, said method comprising the steps of:

(a) generating a plurality of low-level probe pulses, each with a bandwidth that extends substantially over the entire upstream frequency band and that is substantially limited to the upstream frequency band;

(b) transmitting in the coaxial cable portion of the HFC network, over a distance to the impairment, the plurality of low-level probe pulses during a plurality of receiving intervals, respectively, the impairment causing a reflection of the plurality of probe pulses in the form of a plurality of reflected probe pulses, which travel back over the distance;

(c) receiving the plurality of reflected probe pulses during the plurality of receiving intervals, respectively, and receiving the plurality of burst signals during a number of the receiving intervals that overlap in time with the plurality of burst intervals;

(d) measuring a signal level of what is received in step (c) during each of the receiving intervals, such that a plurality of signal level measurements is made for the plurality of receiving intervals, respectively;

(e) determining which of the plurality of receiving intervals are substantially free of the burst signals based on the plurality of signal level measurements;

(f) accumulating substantially only the reflected probe pulses received during the receiving intervals that have been determined to be substantially free of the burst signals;

(g) detecting the impairment by processing the accumulated reflected probe pulses in a matched filter that is configured for the probe pulses;

(h) estimating, from the detection in step (g), a time delay between the transmission of the plurality of probe pulses and the reception of the plurality of reflected probe pulses, respectively; and (i) estimating a value of the distance to the impairment from the time delay and the velocity of propagation of the coaxial cable portion of the HFC network.

28. The method of claim 27, wherein step (e) includes comparing each of the plurality of signal level measurements to a predetermined threshold.

29. The method of claim 28, wherein each of the plurality of low-level probe pulses is a chirp pulse.

\* \* \* \* \*

UNITED STATES PATENT AND TRADEMARK OFFICE
CERTIFICATE OF CORRECTION

PATENT NO.         : 9,960,842 B2
APPLICATION NO.    : 15/283510
DATED              : May 1, 2018
INVENTOR(S)        : Zinevich Page 1 of 1

It is certified that error appears in the above-identified patent and that said Letters Patent is hereby corrected as shown below:

In the Claims

Column 19, Line 59: "claim 16" should read – claim 17 –.

Signed and Sealed this
Seventeenth Day of July, 2018

Andrei Iancu
*Director of the United States Patent and Trademark Office*